United States Patent
Fenton et al.

(10) Patent No.: US 6,968,902 B2
(45) Date of Patent: Nov. 29, 2005

(54) DRILLING AND PRODUCING DEEP WATER SUBSEA WELLS

(75) Inventors: Stephen P. Fenton, Houston, TX (US); Gawain Langford, Houston, TX (US); Francisco Dezen, Katy, TX (US); Lars-Petter Sollie, Houston, TX (US); Jarle Michaelsen, Spikkestad (NO); Nils Arne Soelvik, Boenes (NO)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 10/706,163

(22) Filed: Nov. 12, 2003

(65) Prior Publication Data

US 2004/0140124 A1 Jul. 22, 2004

Related U.S. Application Data

(60) Provisional application No. 60/425,377, filed on Nov. 12, 2002.

(51) Int. Cl.⁷ ............................................. E21B 29/12
(52) U.S. Cl. ..................... 166/358; 166/366; 166/382; 175/7
(58) Field of Search .............................. 166/358, 366, 166/360, 348, 380, 382; 175/7

(56) References Cited

U.S. PATENT DOCUMENTS

| | | | |
|---|---|---|---|
| 2,503,516 A * | 4/1950 | Shrewsbury ................... | 175/6 |
| 3,105,552 A | 10/1963 | Haeber et al. | |
| 3,163,223 A | 12/1964 | Bauer et al. | |
| 3,236,302 A | 2/1966 | Postlewaite | |
| 3,279,536 A | 10/1966 | Wakefield, Jr. | |
| 3,618,661 A * | 11/1971 | Peterman ..................... | 166/343 |
| 3,662,822 A | 5/1972 | Wakefield, Jr. | |
| 3,688,841 A | 9/1972 | Baugh | |
| 3,693,714 A | 9/1972 | Baugh | |
| 3,971,576 A | 7/1976 | Herd et al. | |
| 4,095,649 A | 6/1978 | Chateau et al. | |
| 4,295,665 A | 10/1981 | Pierce | |
| 4,305,468 A * | 12/1981 | Goldsmith ................... | 166/359 |
| 4,550,782 A | 11/1985 | Lawson | |
| 4,561,499 A | 12/1985 | Berner, Jr. et al. | |
| 4,625,806 A * | 12/1986 | Silcox ........................ | 166/358 |
| 4,657,439 A * | 4/1987 | Petersen ..................... | 405/200 |
| 4,673,313 A | 6/1987 | Baugh et al. | |
| 4,681,173 A * | 7/1987 | Disher et al. ................. | 175/7 |
| 4,757,860 A | 7/1988 | Reimert | |
| 4,819,730 A * | 4/1989 | Williford et al. ........... | 166/355 |

(Continued)

FOREIGN PATENT DOCUMENTS

GB 2041836 * 9/1980

*Primary Examiner*—Thomas B. Will
*Assistant Examiner*—Thomas A Beach
(74) *Attorney, Agent, or Firm*—Bracewell & Giuliani LLP

(57) ABSTRACT

Subsea wells are drilled and completed with an offshore floating platform in a manner that allows simultaneous work on more than one well. A first well is drilled and cased. Then a tubing hanger is run through a drilling riser and landed in the wellhead housing. Then, with the same floating platform, the drilling riser is disconnected and moved to a second well. While performing operations on the second well, the operator lowers a production tree from the floating platform on a lift line, and connects it to the first wellhead housing. An ROV assisted subsea plug removal tool is used for plug removal and setting operations. Seabed separation is configured upstream of a production choke valve.

10 Claims, 18 Drawing Sheets

U.S. PATENT DOCUMENTS

| | | |
|---|---|---|
| 4,836,288 A | 6/1989 | Wester |
| 4,850,439 A * | 7/1989 | Lund ............................ 175/52 |
| 4,911,244 A | 3/1990 | Hynes |
| 5,007,769 A | 4/1991 | Legris et al. |
| 5,244,312 A * | 9/1993 | Wybro et al. ............... 405/204 |
| 5,372,199 A | 12/1994 | Cegielski et al. |
| 5,544,707 A | 8/1996 | Hopper et al. |
| 5,560,435 A * | 10/1996 | Sharp ............................. 175/5 |
| 5,794,701 A | 8/1998 | Cunningham et al. |
| 6,085,851 A * | 7/2000 | Scott et al. ..................... 175/7 |
| 6,408,949 B1 | 6/2002 | Aquilera et al. |
| 6,443,240 B1 * | 9/2002 | Scott ............................. 175/7 |
| 6,453,838 B1 * | 9/2002 | Mowell et al. ......... 114/230.13 |
| 6,494,271 B2 * | 12/2002 | Wilson ........................... 175/5 |
| 6,497,286 B1 * | 12/2002 | Hopper ....................... 166/368 |

* cited by examiner

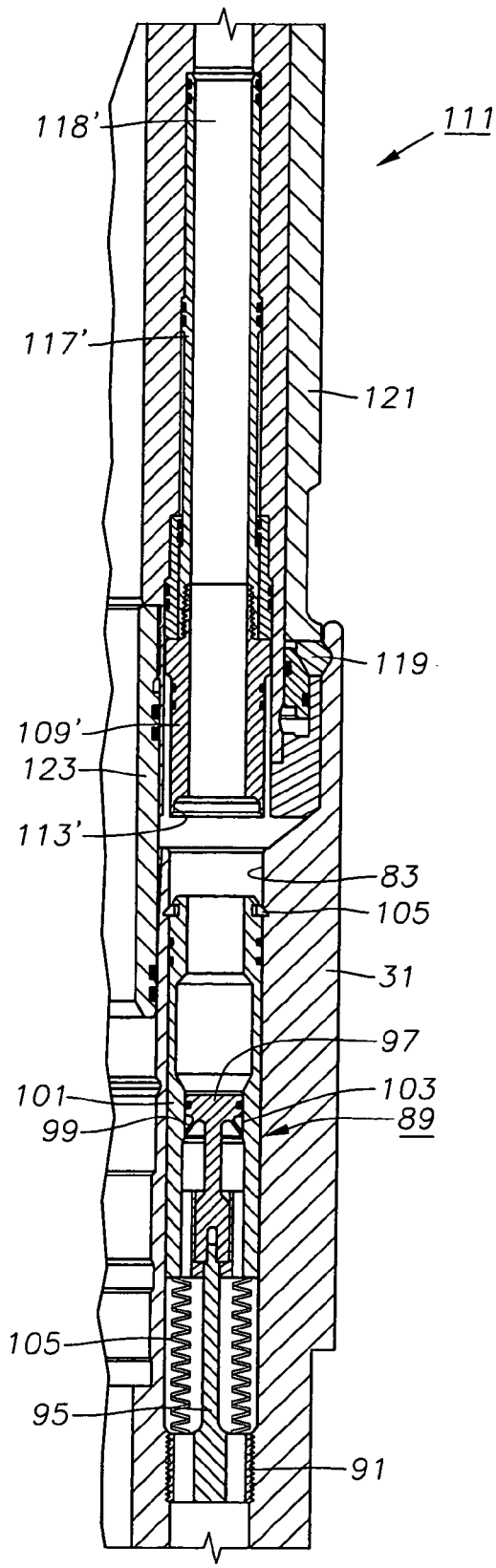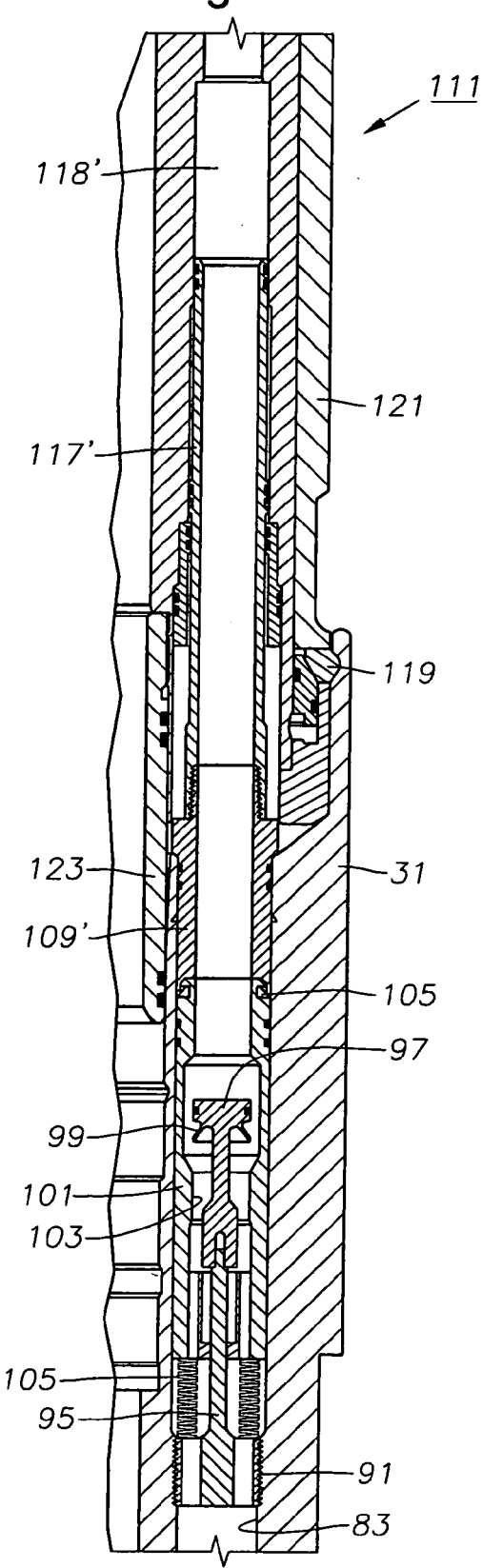

Fig. 13
Fig. 14
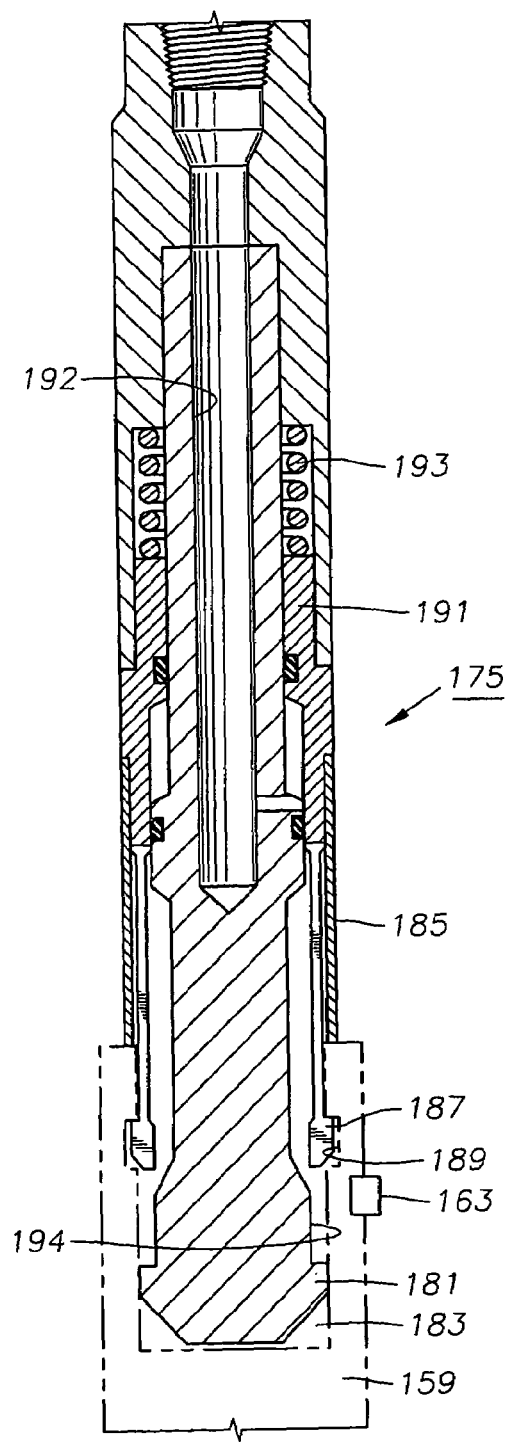
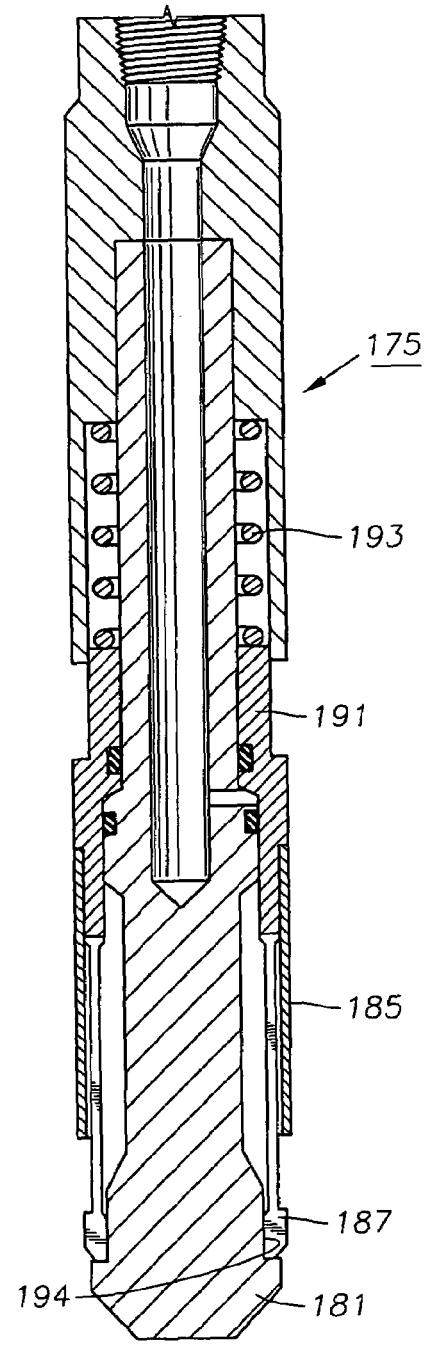

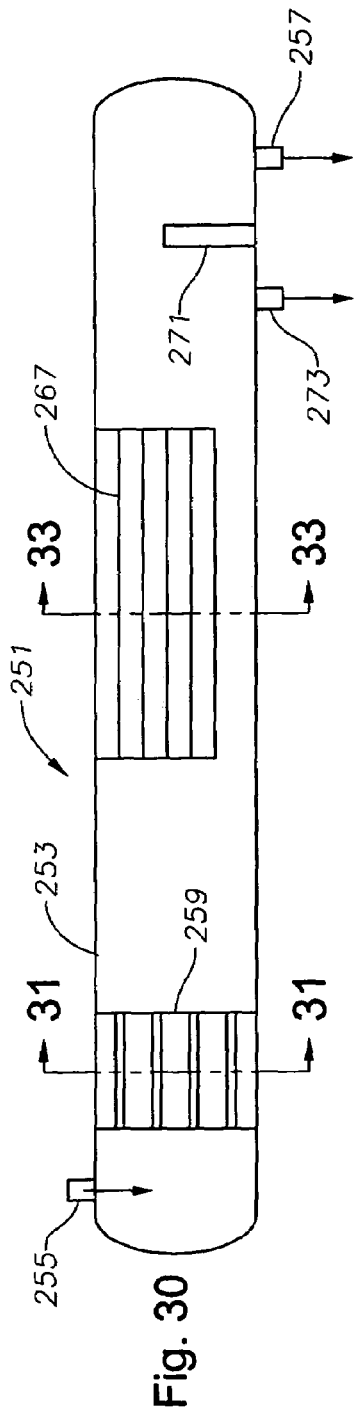
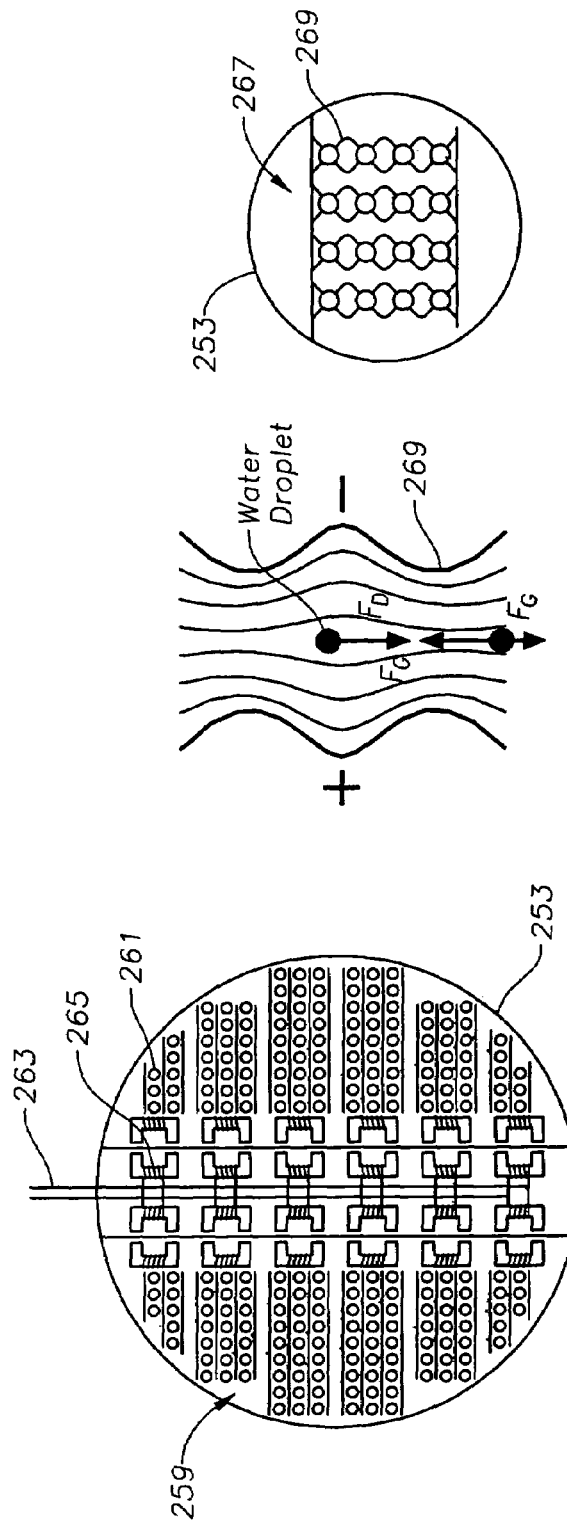
Fig. 30
Fig. 31
Fig. 32
Fig. 33

DRILLING AND PRODUCING DEEP WATER SUBSEA WELLS

CROSS-REFERENCE TO RELATED APPLICATION

This application claims priority to provisional application 60/425,377, filed Nov. 12, 2002.

BACKGROUND OF THE INVENTION

A typical subsea wellhead assembly has a high pressure wellhead housing supported in a lower pressure wellhead housing and secured to casing that extends into the well. One or more casing hangers land in the wellhead housing, the casing hanger being located at the upper end of a string of casing that extends into the well to a deeper depth. A string of tubing extends through the casing for conveying production fluids. A Christmas or production tree mounts to the upper end of the wellhead housing for controlling the well fluid. The production tree is typically a large, heavy assembly, having a number of valves and controls mounted thereon.

One type of tree, sometimes called "conventional" or "vertical", has two bores through it, one of which is the production bore and the other is the tubing annulus access bore. In this type of wellhead assembly, the tubing hanger lands in the wellhead housing. The tubing hanger has two passages through it, one being the production passage and the other being an annulus passage that communicates with the tubing annulus surrounding the tubing. Access to the tubing annulus is necessary, both to monitor and bleed down pressure during production and to circulate fluids down the production tubing and up through the tubing annulus, or vice versa, to either kill the well or circulate out heavy fluid during completion. After the tubing hanger is installed and before the drilling riser is removed for installation of the tree, plugs are temporarily placed in the passages of the tubing hanger. The tree has isolation tubes that stab into engagement with the passages in the tubing hanger when the tree lands on the wellhead housing. This type of tree is normally run on a completion riser that has two strings of conduit. In a dual string completion riser, one string extends from the production passage of the tree to the surface vessel, while the other extends from the tubing annulus passage in the tree to the surface vessel. The plugs are retrieved on wireline through the completion riser, then the completion riser is retrieved. While workable, it is time consuming, however to assemble and run a dual string completion riser. Also, drilling vessels may not have such a completion riser available, requiring one to be supplied on a rental basis.

In another type of tree, sometimes called "horizontal" tree, there is only a single bore in the tree, this being the production passage. The tree is landed before the tubing hanger is installed, then the tubing hanger is lowered and landed in the tree. The tubing hanger is lowered through the riser, which is typically a drilling riser. A wireline plug is run through the tubing hanger running string and installed in the tubing hanger. After removal of the tubing hanger running tool, an internal tree cap is lowered through the drilling riser and installed in the bore of the tree. Access to the tubing annulus is available through choke and kill lines of the drilling riser. The tubing hanger does not have an annulus passage through it, but a bypass extends through the tree to a void space located above the tubing hanger. This void space communicates with the choke and kill lines when the blowout preventer is closed on the tubing hanger running string. In this system, the tree is run on drill pipe, which prevents the drilling rig derrick of the floating platform from being employed on another well while the tree is being run. This is also the case for the "conventional" tree, when installed on completion riser or drill pipe.

In another and less common type of wellhead system, a concentric tubing hanger lands in the wellhead housing in the same manner as a conventional wellhead assembly. The tubing hanger has a production passage and an annulus passage. However, the production passage is concentric with the axis of the tubing hanger, rather than slightly offset as in conventional tubing hangers. The tree does not have a vertical tubing annulus passage through it, thus a dual bore completion riser is not required. Consequently the tree may be run on a monobore riser. A tubing annulus valve is located in the tubing hanger since a plug cannot be temporarily installed and retrieved from the tubing annulus passage with this type of tree.

Normally, the tubing annulus valve is a check valve that prevents upward flow that might occur through the tubing annulus but allows downward flow. A disadvantage is that one cannot readily test a tubing annulus check valve to determine whether or not it is properly closing. A tubing annulus valve that is hydraulically actuated and which could be tested from above is desireable. However, these typically require hydraulic passages in the tubing hanger, which take up space and add complexity to the tubing hanger, rendering the designs potentially unreliable due to space restrictions.

During subsea well drilling, the floating platform may complete only one well at a time for production. However, in some instances, a platform might drill and case a number of nearby wells, and defer running the production trees until later. The production trees may be ran by the same platform or another. There have been instances where a tree was run by a lift line by a vessel onto a wellhead housing previously installed by another vessel. Generally, however, trees are run either on a completion riser or on drill pipe because they are large and very heavy. Both of these procedures require a derrick and drawworks. Drilling a well or running tubing also requires a derrick and drawworks, and typically, a floating platform has only one. Being unable to run a production tree from a platform at the same time that the platform is drilling or completing another slows field development.

SUMMARY OF THE INVENTION

In one part of this method, more than one subsea well is undergoing completion and/or drilling simultaneously from the same floating platform. The operator drills and cases a first well with the use of a drilling riser. Then, the operator disconnects the drilling riser from the first well and begins operations on a second well. Preferably, after disconnecting the drilling riser from the first wellhead, the operator moves the platform a short distance to position the derrick above the second well. While at least some of the operations are taking place on the second well, the operator lowers from the same platform a production tree onto the first wellhead housing, using a lift line.

Preferably, before disconnecting the riser from the first well and lowering the tree, the operator runs tubing, perforates the first well, and sets a plug in the tubing hanger. In the preferred embodiment, the plug is subsequently removed from the tubing hanger through the tree with the assistance of a remote operated vehicle (ROV) plug removal tool. Also, in the preferred embodiment, the tubing hanger has a tubing annulus valve that is normally closed and can be selectively opened after the tree lands on the wellhead housing. As the tree lands on the wellhead housing, an orientation member associated with the tubing hanger orients the tree.

In another aspect of the invention, the tree is connected to a flowline leading to a subsea fluid separator. The outlet of the subsea fluid separator leads to a choke to control the flowrate. The choke leads to a subsea manifold. This arrangement is important in minimizing flow disturbance prior to entering the separator, and supports optimum efficiency within the separation system.

BRIEF DESCRIPTION OF THE DRAWINGS

FIG. 6 is an enlarged sectional view of the tubing annulus valve of FIG. 4, shown in a closed position while a tubing hanger running tool is being connected to the tubing hanger.

FIG. 7 is a sectional view of the tubing annulus valve as shown in FIG. 6, but shown in an open position.

FIG. 13 is a schematic sectional view of a plug retrieving attachment for the plug tool of FIG. 11, shown in a disengaged position with a plug illustrated by the dotted lines.

FIG. 14 is a more detailed sectional view of the plug retrieving attachment of FIG. 13, shown in an engaged position.

FIG. 30 is a schematic sectional view of one of the separators shown in FIG. 29.

FIG. 31 is an enlarged schematic sectional view of the separator of FIG. 30, taken along the line 31—31 of FIG. 30, illustrating the coalescence separator portion.

FIG. 32 is an enlarged schematic view of a dielectrophoresis separator portion of the separator of FIG. 30.

FIG. 33 is an enlarged schematic sectional view of the separator of FIG. 30, taken along the line 33—33 of FIG. 30, illustrating the dielectrophoresis separator portion.

DETAILED DESCRIPTION OF THE INVENTION

Overall Structure of Subsea Wellhead Assembly

Figure 1A:
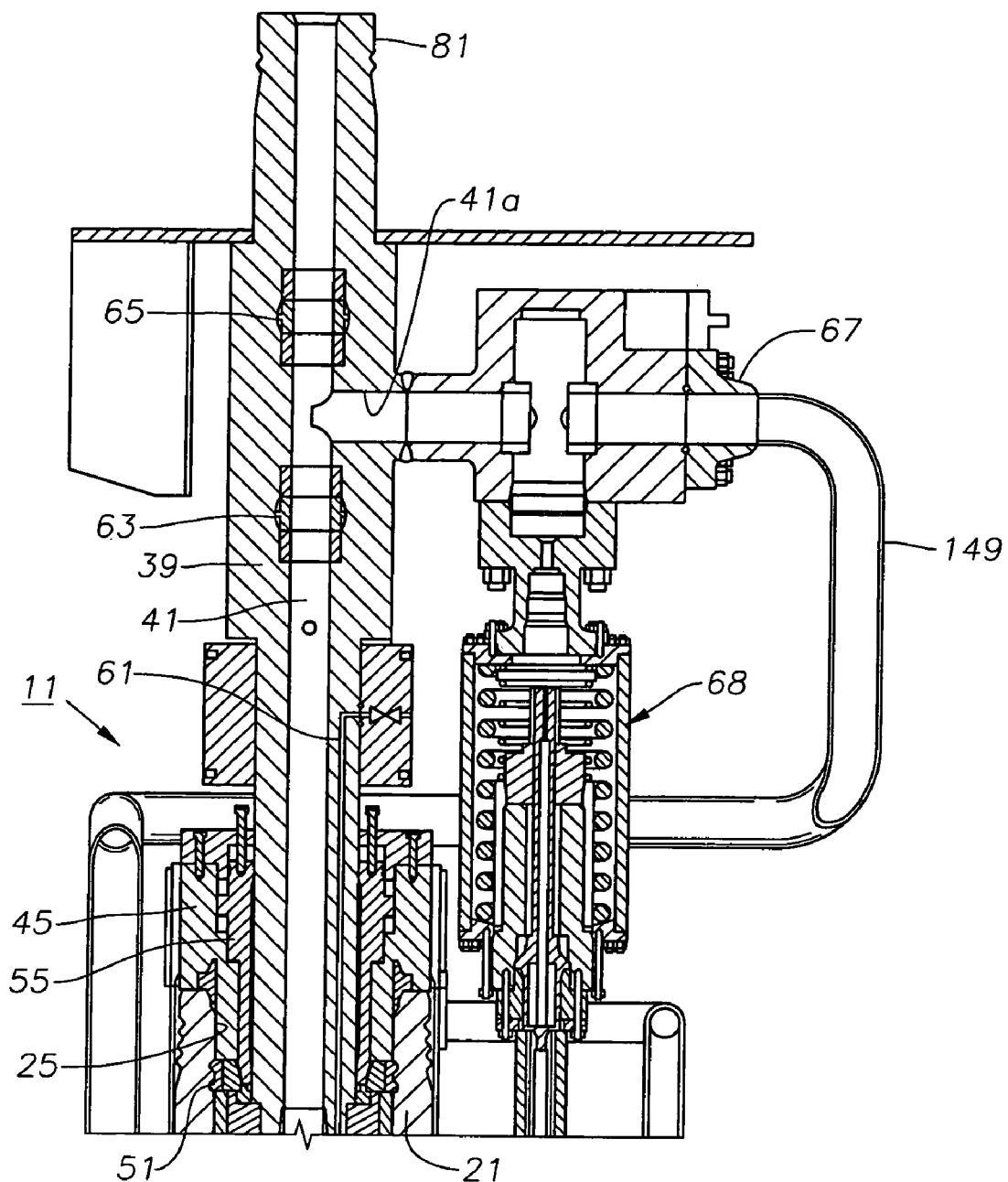
FIGS. 1A and 1B comprise a vertical sectional view of a wellhead assembly constructed in accordance with this invention.
Figure 1B:
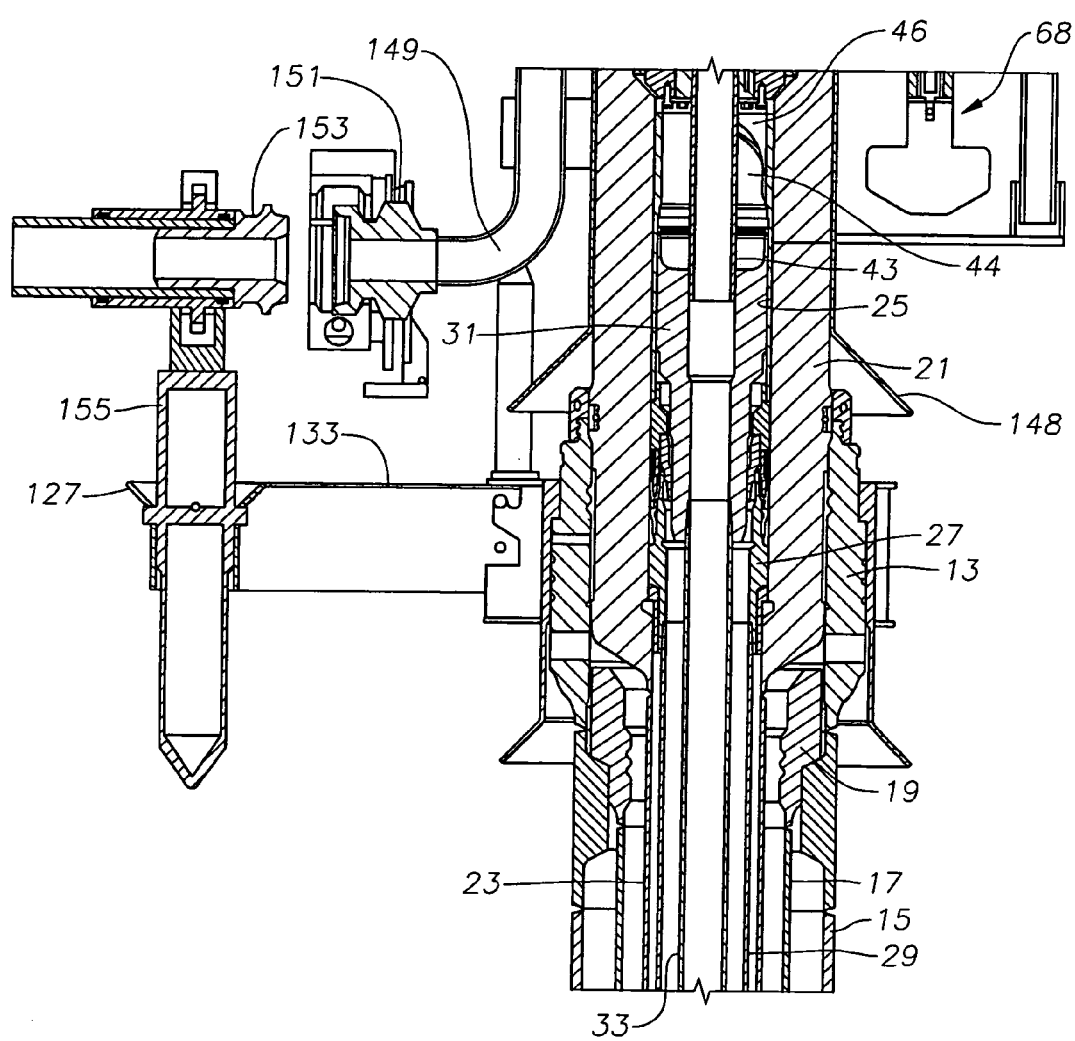

Referring to FIG. 1B, a lower portion of a wellhead assembly 11 includes an outer or low pressure wellhead housing 13 that locates on the sea floor and is secured to a string of large diameter conductor pipe 15 that extends into the well. In this embodiment, a first string of casing 17 is suspended on a lower end of outer wellhead housing 13 by a hanger 19. However, casing 17 and hanger 19 are not always suspended from the outer wellhead housing 13 and can be eliminated in many cases.

An inner or high pressure wellhead housing 21 lands in and is supported within the bore of outer wellhead housing 13. Inner wellhead housing 21 is located at the upper end of a string of casing 23 that extends through casing 17 to a greater depth. Inner wellhead housing 21 has a bore 25 with at least one casing hanger 27 located therein. Casing hanger 27 is sealed within bore 25 and secured to the upper end of a string of casing 29 that extends through casing 23 to a greater depth. Casing hanger 27 has a load shoulder 28 located within its bore or bowl.

Figure 2:
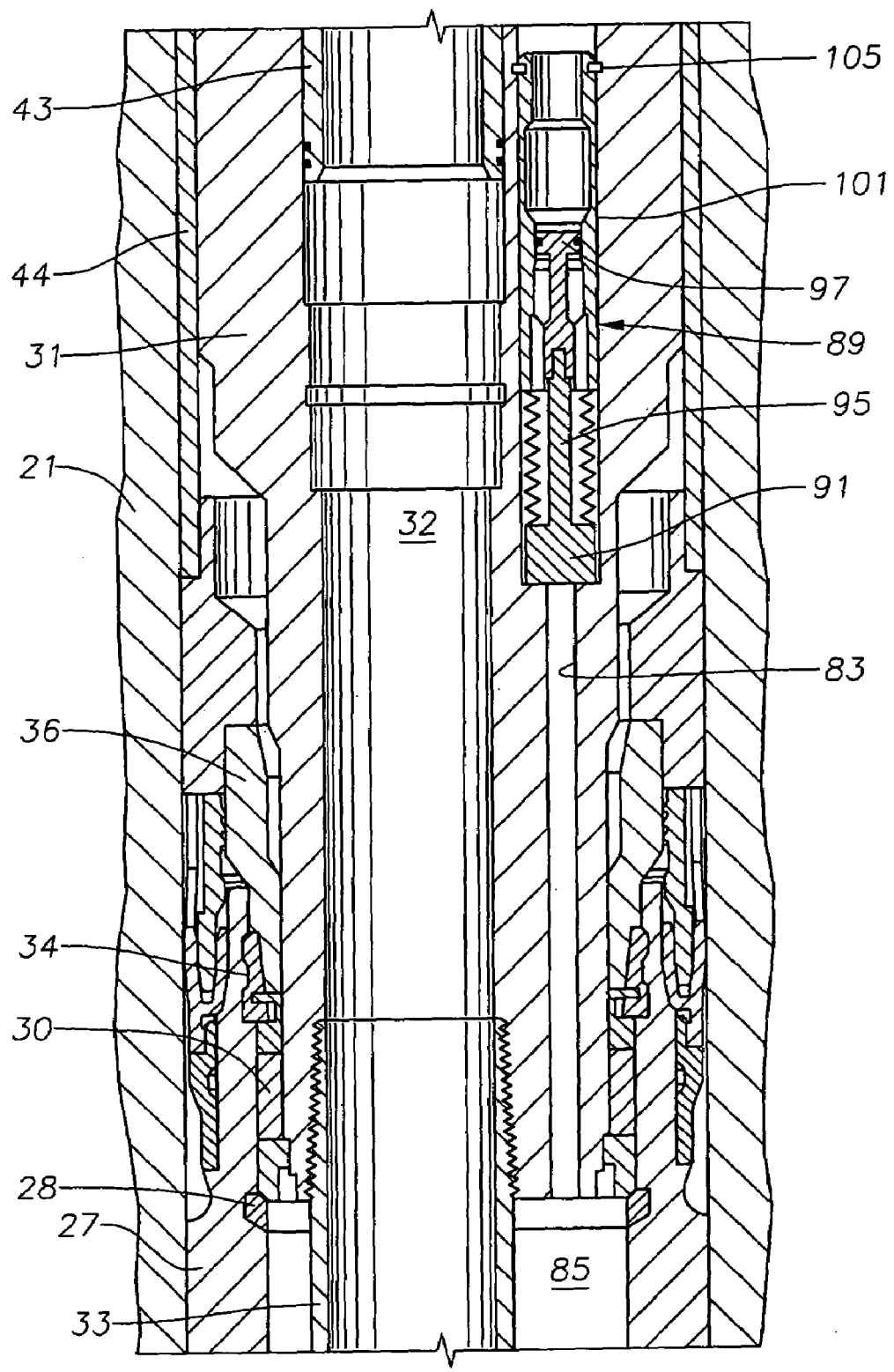
FIG. 2 is an enlarged sectional view of a portion of the wellhead assembly of FIGS. 1A and 1B, the sectional plane being different than in FIGS. 1A and 1B.

In this embodiment, a tubing hanger 31 is landed, locked, and sealed within the bore of casing hanger 27, or alternatively may lock into the bore of high pressure wellhead housing 21, or an adapter bowl located in the high pressure wellhead housing. Referring to FIG. 2, tubing hanger 31 has a lower end that lands on load shoulder 28. A seal 30 seals between the exterior of tubing hanger 31 and the bore of casing hanger 27 above load shoulder 28. A split lock ring 34 moves from a retracted position radially outward to lock tubing hanger 31 to an internal profile in casing hanger 27, or high pressure wellhead housing 21, or an adapter bowl. A sleeve 36, when moved axially downward, energizes seal 30 as well as pushes lock ring 34 to the locked position. Tubing hanger 31 is secured to the upper end of a string of production tubing 33. Tubing hanger 31 has a production passage 32 that is coaxial with tubing 33.

Figure 3:
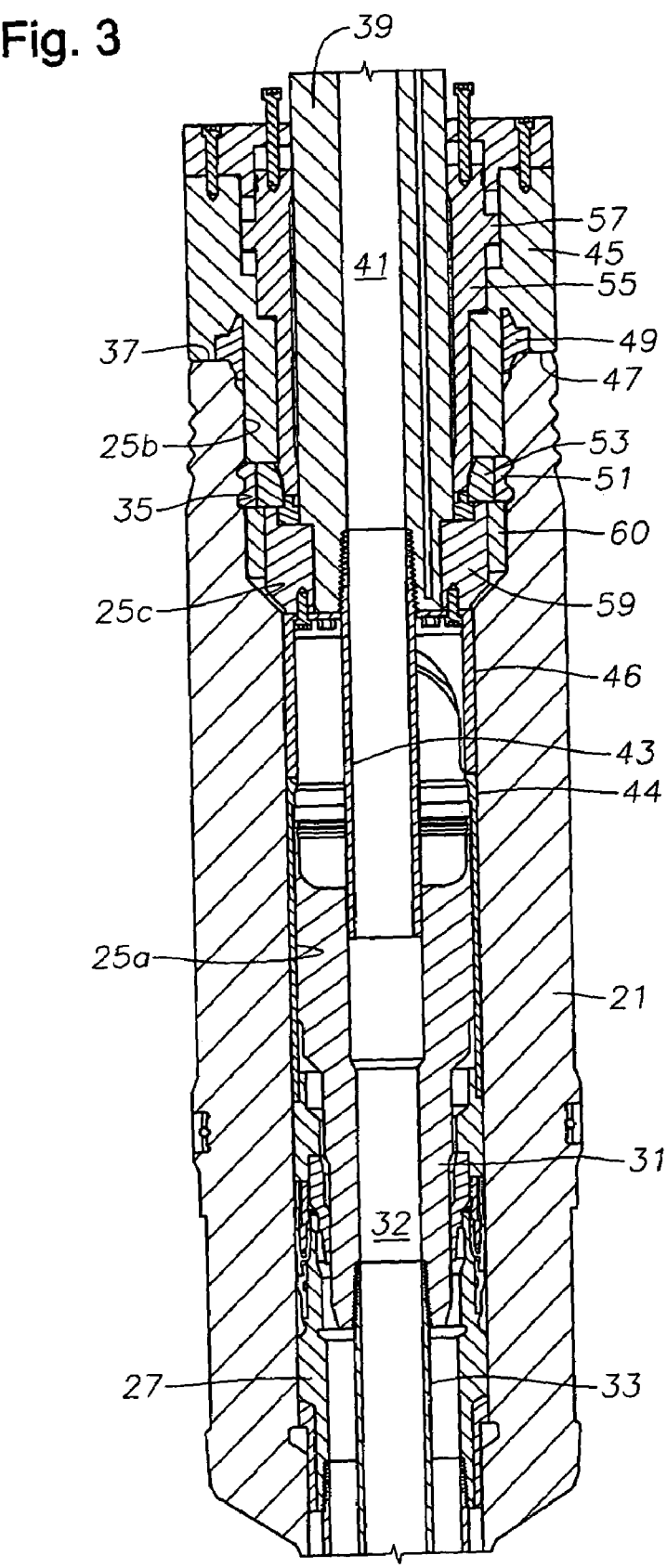
FIG. 3 is an enlarged sectional view of a portion of the wellhead assembly of FIGS. 1A and 1B.

Referring to FIG. 3, inner wellhead housing bore 25 has a lower portion 25a that has a smaller diameter than upper portion 25b. The difference in diameters results in a conical generally upward facing transition portion or shoulder 25c located between portions 25a and 25b. Wellhead housing bore upper portion 25b has a grooved profile 35 formed therein above tubing hanger 31. Profile 35 is located a short distance below rim 37, which is the upper end of inner wellhead housing 21.

As shown in FIG. 1A, a Christmas or production tree 39 has a lower portion that inserts into wellhead housing 21. Production tree 39 has a production passage 41 extending through it that has an outlet port 41a extending laterally outward. Production tree 39 has an isolation tube 43 that depends downward from its lower end and stabs sealingly into production passage 32 of tubing hanger 31. The lower end of production tree 39 extends into bore 25 of inner wellhead housing 21 towards bore transition section 25c (FIG. 3).

Referring again to FIG. 3, an orientation sleeve 44 is a part of and extends upward from tubing hanger 31. Orientation sleeve 44 is nonrotatably mounted to the exterior of the body of tubing hanger 31. Orientation sleeve 44 has a helical or tapered contour formed on its upper edge. A mating orientation sleeve 46 with a matching contour on its lower edge is secured to the lower end of production tree 39. When tree 39 is lowered into wellhead housing 21, orientation sleeve 46 engages the matching contour of orientation sleeve 46 to rotate production tree 39 and accurately orient it in the desired direction relative to tubing hanger 31. The capture range of the helical/tapered interface directly affects the height of the orientation sleeve. In order to minimize the effect of this onto the system, the tree can be nominally pre-aligned via a supplementary mechanical register, via the structural sub-frame 133. This is achieved in the same manner, typified by a pin to funnel arrangement, as that described later for registering the correct orientation of the BOP orientation spool.

Tree and Wellhead Housing Internal Connector

Tree 39 includes a connector assembly for securing it to wellhead housing 21. The connector assembly includes a connector body 45 that has a downward facing shoulder 47 that lands on rim 37. Connector body 45 is rigidly attached to tree 39. A seal 49 seals between rim 37 and shoulder 47. Connector body 45 also extends downward into wellhead housing 21. A locking element 51 is located at the lower end of connector body 45 for engaging profile 35. Locking element 51 could be of a variety of types. In this embodiment, locking element 51 comprises an outer split ring that has a mating profile to groove 35. A plurality of dogs 53 located on the inner diameter of locking element 51 push locking element 51 radially outward when moved by a cam sleeve 55. Cam sleeve 55 moves axially and is hydraulically driven by hydraulic fluid supplied to a piston 57, or else by rods connected to externally mounted hydraulic cylinders.

The connector assembly has an extended or retainer portion 59 that extends downward from connector body 45 in this embodiment. Extended portion 59 is located above and secured to orientation sleeve 44. A collar 60 is threaded to the outer diameter of extended portion 59 for retaining locking element 51 and dogs 53 with connector body 45. Alternately dogs 53 could be used to engage profile 35 and locking element 51 omitted. In that case, windows could be provided for the dogs in connector body 45, and extended portion 59 and collar 60 would be integrally formed with connector body 45.

Referring to FIG. 1A, a control passage 61 extends through tree 39 to an exterior side portion, typically for supplying control fluid. Although not shown, there are a number of these passages, and they lead to connector tubes on the lower end of tree 39. The connector tubes stab into mating passages on the upper end of tubing hanger 31. These passages lead to hydraulic and/or electrical control lines that are not shown but extend below tubing hanger 31 on the outside of production tubing 33. These control lines lead to downhole equipment in the string of tubing 33, such as a downhole safety valve and downhole pressure and temperature monitoring devices.

At least one valve is mounted to production tree 39 for controlling fluid flow. In the preferred embodiment, the valves include a master valve 63 and a swab valve 65 located in production passage 41. A safety shutoff valve 67 is mounted to port 41a. The hydraulic actuator 68 for safety shutoff valve 67 is shown. Valves 63 and 65 may be either hydraulically actuated or mechanically actuated (typically by ROV).

Referring again to FIG. 1A, tree 39 has a mandrel 81 on its upper end that protrudes upward. Mandrel 81 is typically sized for receiving a connector for connection to a small diameter, lightweight riser, such as for certain workover purposes. Mandrel 81 also enables other methods of intervention.

Tubing Annulus Access

Figure 4:
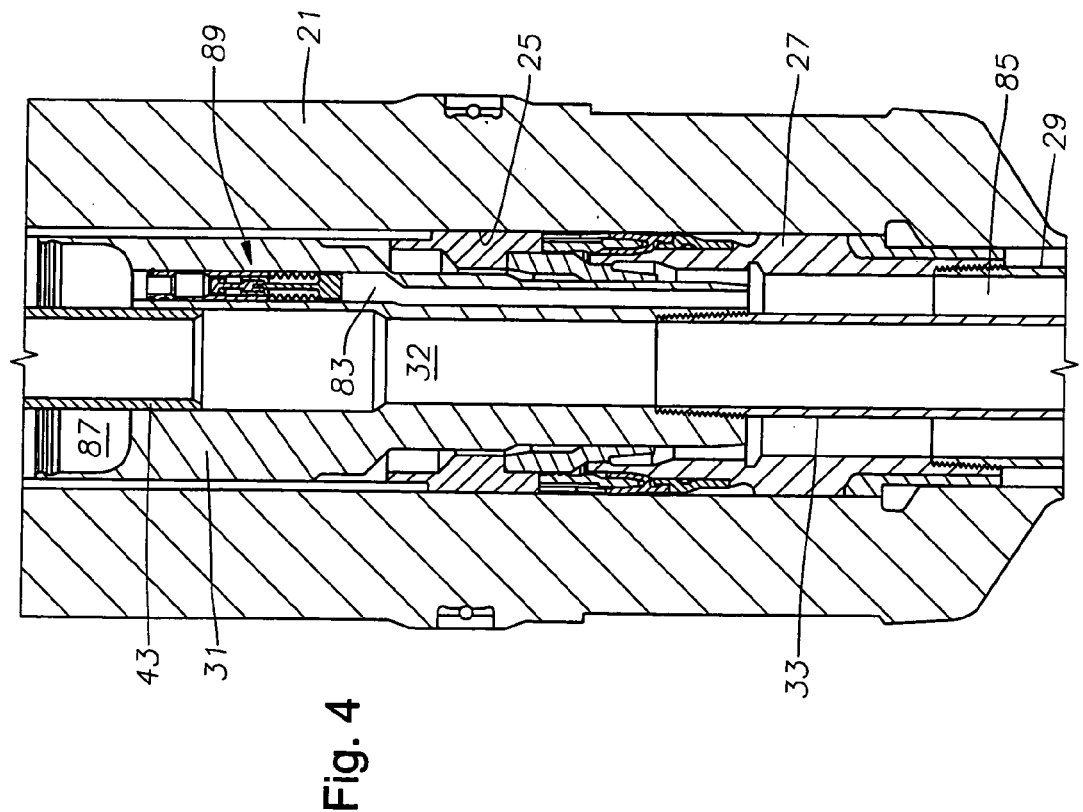
FIG. 4 is an another sectional view of a portion of the wellhead assembly of FIGS. 1A and 1B, but shown in same sectional plane as in FIG. 2 to illustrate a tubing annulus valve in a closed position.

FIG. 4 illustrates a tubing annulus passage 83, which is not shown in FIG. 1B or 3 because tubing annulus passage 83 is located in a different vertical sectional plane than that shown in FIGS. 1B and 3. Tubing annulus passage 83 extends vertically through tubing hanger 31 from an upper end portion to a lower end, where it communicates with a tubing annulus 85 surrounding tubing 33. The upper and lower ends of tubing annulus passage 83 may be slightly radially offset from each other, as shown in FIG. 4. An annular void space 87 surrounds isolation tube 43 between the upper end of tubing hanger 31 and the lower end of tree 39.

Figure 5:
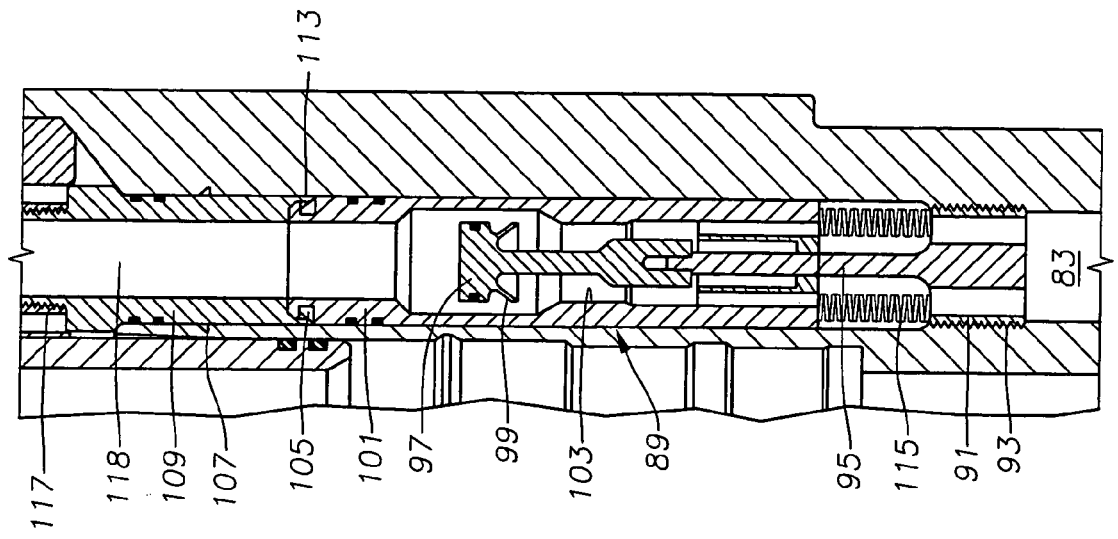
FIG. 5 is an enlarged sectional view of the tubing annulus valve of FIG. 4, shown in an open position and engaged by an engaging member of the production tree.

A tubing annulus valve 89 is mounted in tubing annulus passage 83 to block tubing annulus passage 83 from flow in either direction when closed. Referring to FIG. 5, tubing annulus valve 89 has a stem base 91 that is secured by threads 93 to tubing annulus passage 83. A stem 95 extends upward from stem base 91 along the axis of tubing annulus passage 83. An enlarged valve head 97 forms the upper end of stem 95. Valve head 97 has a secondary resilient seal as well as a primary lip seal 99 made of metal in this embodiment.

A shuttle sleeve 101 is reciprocally carried in tubing annulus passage 83. While in the upper closed position shown in FIGS. 4 and 6, the upper end of sleeve 101 is a short distance below an upper end portion of tubing hanger 31. While in the lower open position, shown in FIGS. 5 and 7, sleeve 101 is in a lower position relative to valve head 97. Sleeve 101 has a reduced diameter port or seat 103 formed in its interior. Seat 103 is sealingly engaged by lip seal 99 as well as the resilient seal of valve head 97 while sleeve 101 is in the lower position.

An outward biased split ring 105 is mounted to the outer diameter of sleeve 101 near its upper end. Split ring 105 has a downward tapered upper surface and a lower surface that is located in a plane perpendicular to the axis of tubing annulus passage 83. A mating groove 107 is engaged by split ring 105 while sleeve 101 is in the upper, closed position. Split ring 105 snaps into groove 107, operating as a detent or retainer to prevent downward movement of sleeve 101.

FIG. 5 shows an engaging tool or member 109 extending into the upper end of tubing annulus passage 83 into engagement with the upper end of sleeve 101. Engaging member 109 is a downward extending component of tree 39 (FIG. 1A) and is used for moving sleeve 101 from the upper to the lower position. A second identical engaging member 109', shown in FIGS. 6 and 7, is mounted to a running tool 111 used to run tubing hanger 31. Engaging member 109 has a lip 113 on its lower end that mates with the upward facing taper on split ring 105. Lip 113 slides over and causes split ring 105 to contract, enabling engaging member 109 to push sleeve 101 downward to the open position. A spring 115, which may be a plurality of Belleville washers, is located between stem base 91 and the lower end of sleeve 101. Spring 115 urges sleeve 101 to the upper closed position. Any pressure in passage 83 would assist spring 155 in moving sleeve 101 to the closed position.

Engaging member 109 is secured to the lower end of an actuator 117, which is mounted in tree 39. Actuator 117 is a hollow, tubular member with open ends reciprocally carried in a tubing annulus passage 118 in tree 39 (FIG. 3). Actuator 117 has a piston portion on its exterior side wall that is selectively supplied with hydraulic fluid for moving actuator 117 between upper and lower positions. Tubing annulus passage 118 extends through tree 39 to an exterior side portion of tree 39 for connection to a tubing annulus line that leads typically to a subsea manifold or an umbilical that serves the tree. Tubing annulus passage in tree 118 does not extend axially to the upper end of tree 39.

When actuator 117 is moved to the lower position, engaging member 109 engages and pushes sleeve 101 from the closed position to the open position. FIGS. 6 and 7 show a similar actuator 117' that forms a part of running tool 111 and works in the same manner as actuator 117. Like actuator 117, actuator 117' has a piston portion that is carried in a hydraulic fluid chamber for causing the upward and downward movement in response to hydraulic pressure. Passage 118' leads to an exterior upper portion of running tool 111 for delivering and receiving tubing annulus fluid.

Running tool 111 has conventional features for running tubing hanger 31, including setting a seal between tubing hanger 31 and bore 25 of wellhead housing 21 (FIG. 4). Running tool 111 has a lock member 119 that is radially and outwardly expansible into a mating groove formed in an interior upward extending sleeve portion of tubing hanger 31. Lock member 119 secures running tool 111 to tubing hanger 31 while tubing 33 is being lowered into the well. Lock member 119 is energized and released by a lock member actuator 121, which is also hydraulically driven. Running tool 111 has a sleeve 123 that slides sealingly into the bore 32 of tubing hanger 31. Sleeve 123 isolates the upper end of tubing annulus passage 83 from production passage 32 (FIG. 4) in tubing hanger 31.

Orientation

Figure 8:
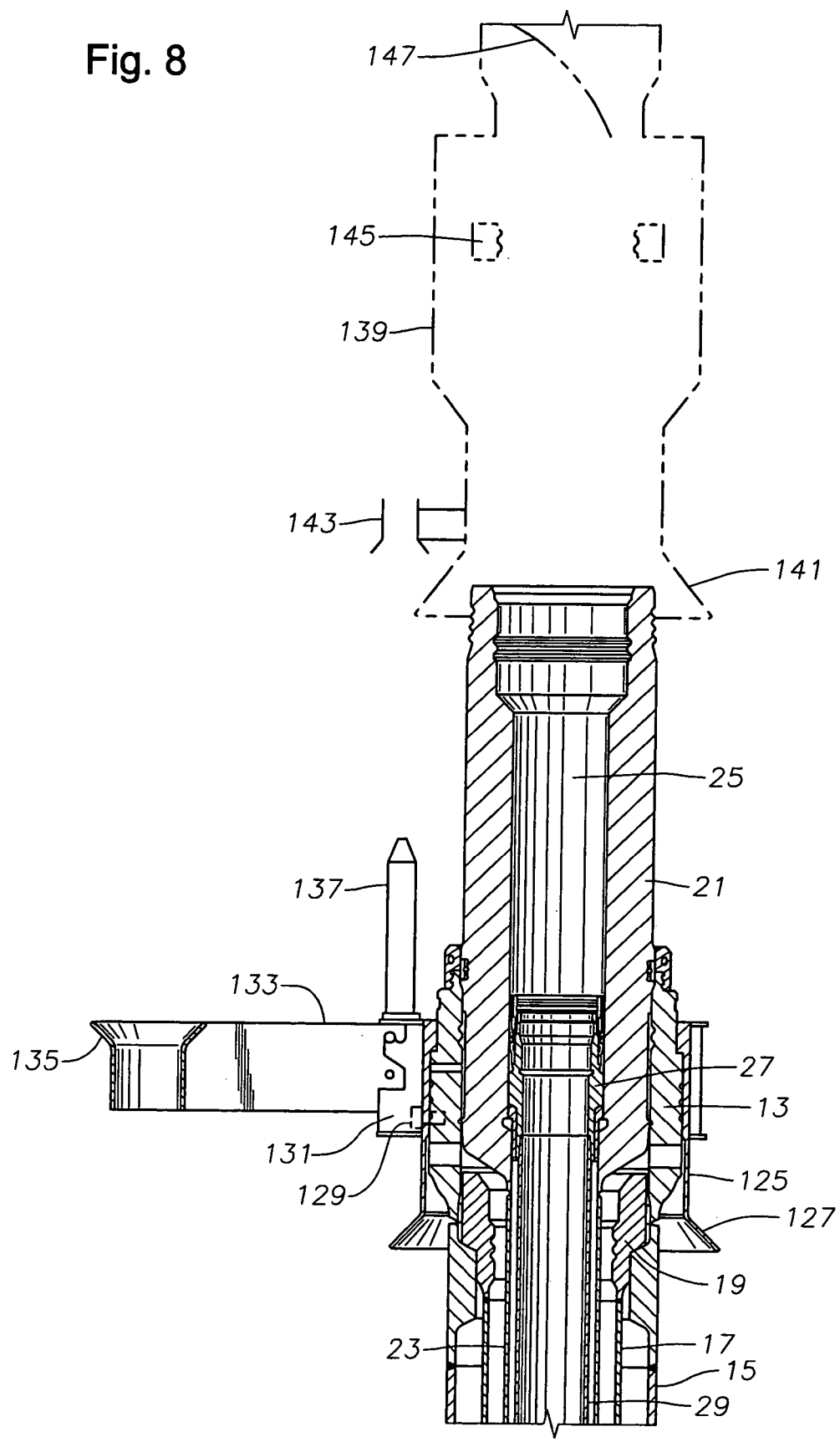
FIG. 8 is a sectional view of the wellhead housing of the wellhead assembly of FIGS. 1A and 1B after running casing and in the process of receiving a BOP orientation spool.

Referring to FIG. 8, a ring 125 is mounted to the exterior of outer wellhead housing 13, also referred to as a conductor housing. Ring 125 has a depending funnel 127 and is selectively rotatable on outer wellhead housing 13 for orienting tubing hanger 31 and tree 39 (FIG. 3) in a desired position relative to other subsea wells and equipment. A lock pin or screw 129 will selectively lock ring 125 in the desired position. An arm bracket 131 is mounted to ring 125 for rotation therewith. Arm bracket 131 cantilever supports a horizontally extending arm 133. Arm 133 has an upward facing socket on its outer end 131. Also, a guide mechanical register 137 protrudes upward from arm 133, depicted and typified by a pin.

Ring 125 is normally installed on outer wellhead housing 13 at the surface before outer wellhead housing 13 is lowered into the sea. Arm 133 will be attached to arm bracket 131 below the rig floor but at the surface. After outer wellhead housing 13 is installed at the sea floor, if necessary, an ROV may be employed later in the subsea construction phase to rotate ring 125 and/or arm 133, to a different orientation, typically towards a manifold connection point.

A BOP (blowout preventer) adapter 139 is being shown lowered over inner or high pressure housing 21. BOP orientation spool 139 is used to orient tubing hanger 31 (FIG. 3) relative to arm 133. BOP orientation spool 139 is preferably lowered on a lift line after the well has been drilled and casing hanger 27 installed. The drilling riser, along with the BOP, will have been removed from the upper end of inner wellhead housing 21 prior to lowering BOP orientation spool 139 in place. Alternatively, the BOP orientation spool may be deployed with the BOP and riser system, subject to rig handling limitations. BOP orientation spool 139 has a guide socket 143 that is mounted to its exterior at a point for aligning with pin 137. A funnel 141 on the lower end of BOP orientation spool 139 assists in guiding BOP orientation spool 139 over inner wellhead housing 21. Socket 143 will orient BOP orientation spool 139 to a position depending upon the orientation of arm 133 and pin 137. An ROV (not shown) will be used to assist guide socket 143 in aligning with guide pin 137.

BOP orientation spool 139 has a plurality of dogs 145 that are hydraulically energized to engage an external profile on inner wellhead housing 21. BOP orientation spool 139 also has seals (not shown) that seal its bore to bore 25 of wellhead housing 21. A helical orienting slot 147 is located within the bore of BOP orientation spool 139. Slot 147 is positioned to be engaged by a mating pin or lug on running tool 111 (FIG. 6) for tubing hanger 31. This engagement causes running tool 111 to orient tubing hanger 31 in a desired orientation relative to the orientation of arm 133. Alternatively, a radially actuated pin (operated via mechanical or hydraulic means, using an ROV) is mounted within the BOP orientation spool, that engages with a helix on the tubing hanger running tool. One example of why this alternative method may be used, would be the use of a "slim" tubing hanger (typically 13⅝" nom. OD) inside a traditional 18¾" BOP and riser system, such that the "reach" of the pin/lug of the tubing hanger running tool would be unable to bridge the gap.

Figure 10:
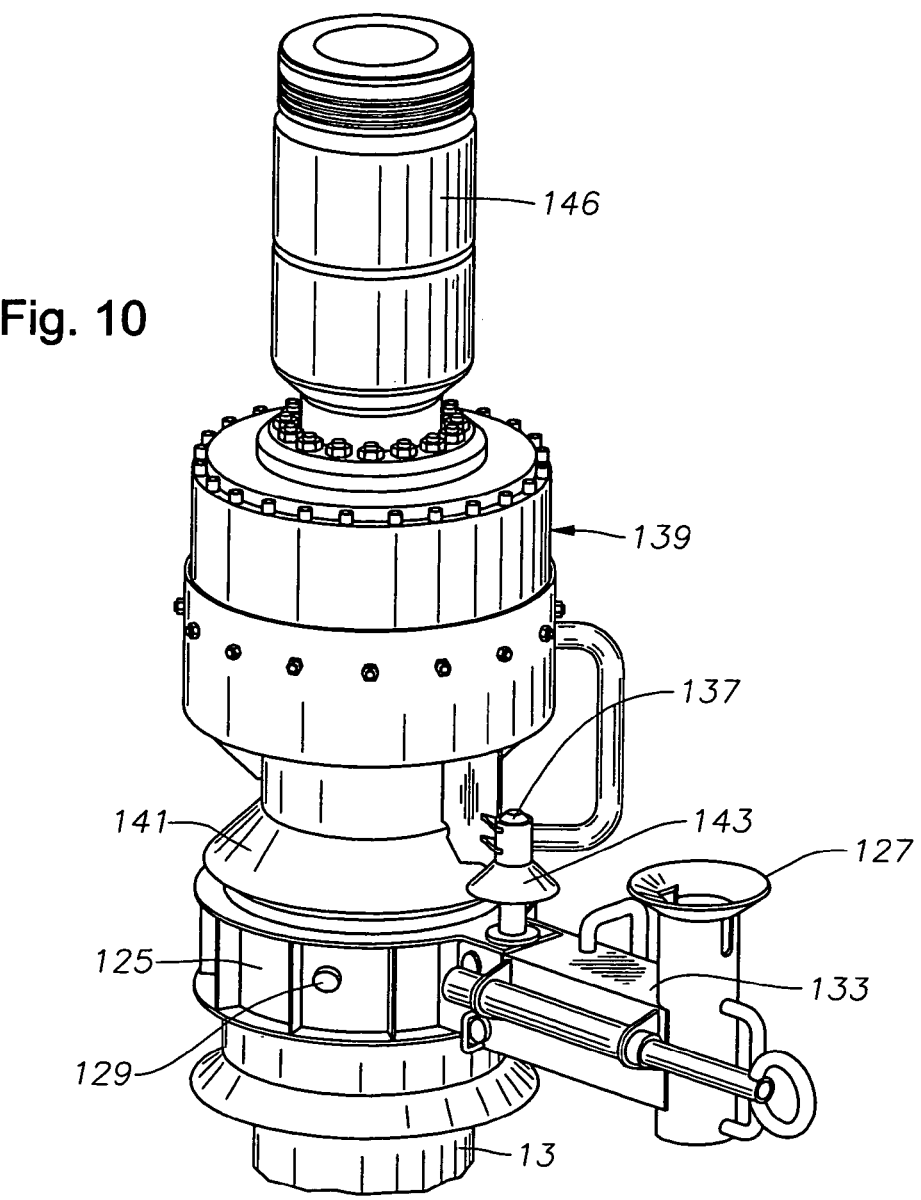
FIG. 10 is a perspective view of the wellhead assembly of FIGS. 1A and 1B, after the BOP orientation spool of FIG. 8 has landed.

FIG. 10 is a perspective view showing BOP orientation spool 139 in position on inner wellhead housing 21, which is not shown in FIG. 10 because it is located within the bore of BOP orientation spool 139. BOP orientation spool 139 has an upper end with a mandrel 146. The drilling riser and BOP will connect to the external profile on mandrel 146 after BOP orientation spool 139 has been connected to inner wellhead housing 21, unless the BOP orientation spool is deployed via the BOP and riser system.

Once BOP orientation spool 139 has oriented tubing hanger 31 (FIG. 1B), the well will typically be perforated and tested. Tubing hanger 31 must be oriented relative to the arm 133 because orientation sleeve 44 (FIG. 3) of tubing hanger 31 provides final orientation to tree 39, as shown in FIGS. 1A and 1B. Tree 39 has a tree funnel 148 that slides over inner wellhead housing 21 as it is landing.

The safety shutoff valve 67 of tree 39 is connected to a flow line loop 149 that leads around tree 39 to a flow line connector 151 on the opposite side as shown in FIG. 1B. Flow line connector 151 will connect to a flow line 153 that typically leads to a manifold or subsea processing equipment. In this embodiment, flow line 153 is mounted to a vertical guide pin or mandrel 155 that stabs into guide funnel 135 to orient to tree 39. Other types of connections to flow line connector 151 could also be employed. Consequently, tree is oriented so that its flowline connector 151 will register with flowline 153.

Plug Retrieval and Installation

Figure 11:
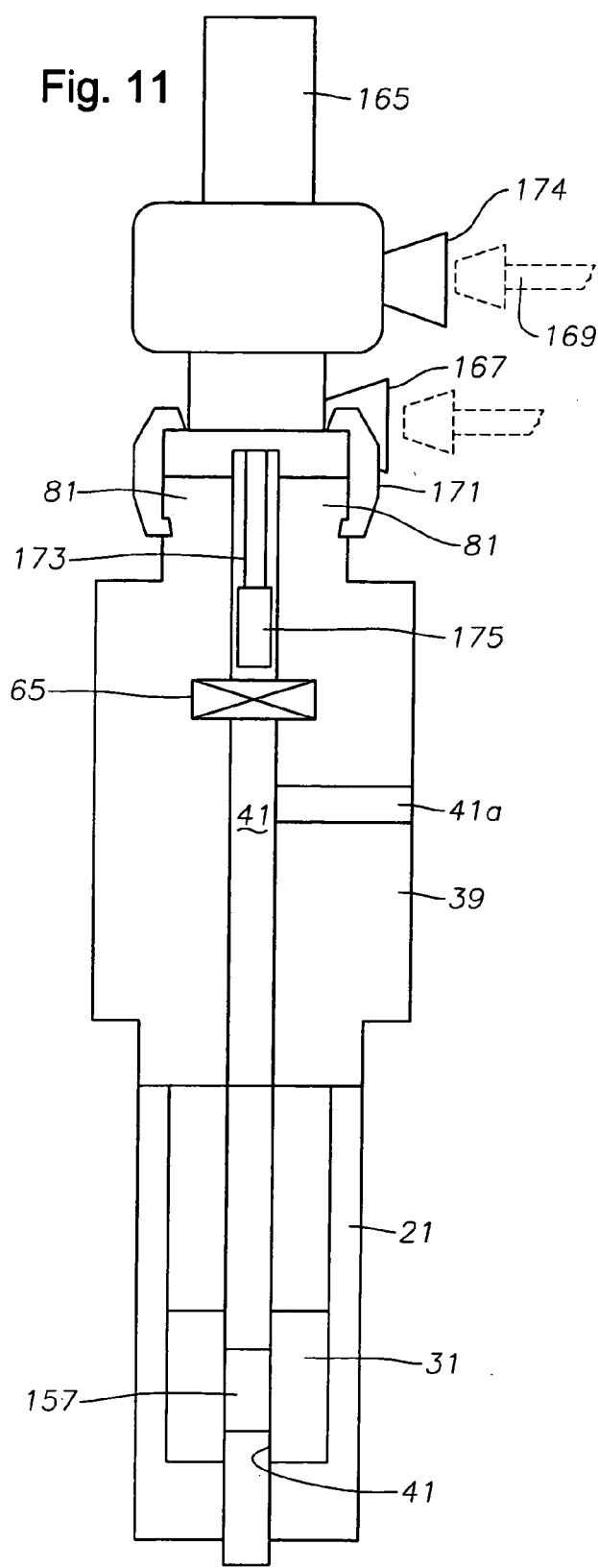
FIG. 11 is a schematic vertical sectional view of the wellhead assembly of FIGS. 1A and 1B, showing an ROV deployed plug tool mounted on the tree.

After tree 39 is installed, a plug 159 (FIG. 12) must be removed from a plug profile 157 located within tubing hanger 31, as shown in FIG. 11. Plug 159 maintains pressure that is within tubing 33 after BOP orientation spool 139 (FIG. 10) is removed and prior to installing tree 39 (FIG. 1A). Plug 159 is conventional and has one or more seals 161 that seal within production passage 41 of tubing hanger 31. Plug 159 has a plurality of locking elements 163 that will move radially outward between a retracted and an extended position. Locking elements 163 engage a mating groove in profile 157.

Preferably, rather than utilizing wireline inside a workover riser, as is typical, an ROV deployed plug tool 165 is utilized. Plug tool 165 does not have a riser extending to the surface, rather it is lowered on a lift line. Plug tool 165 has a hydraulic or mechanical stab 167 for engagement by ROV 169. Plug tool 165 lands on top of tree mandrel 81. A seal retained in plug tool 165 engages a pocket in mandrel 81 of tree 39. When supplied with hydraulic pressure or mechanical movement from ROV 169, a connector 171 will engage mandrel 81 of tree 39. Similarly, connector 171 can be retracted by hydraulic pressure or mechanical movement supplied from ROV 169.

Plug tool 165 has an axially movable stem 173 that is operated by hydraulic pressure supplied to a hydraulic stab 174. A retrieving tool 175 is located on the lower end of stem 173 for retrieving plug 159. Similarly, a setting tool 177 may be attached to stem 173 for setting plug 159 in the event of a workover that requires removal of tree 39. Setting tool 177 may be of a variety of types and for illustration of the principle, is shown connected by shear pin 179 to plug 159. Once locking elements 163 have engaged profile 157, an upward pull on stem 173 causes shear pin 179 to shear, leaving plug 159 in place.

Retrieving tool 175, shown in FIGS. 13 and 14, may also be of a variety of conventional types. In this embodiment, retrieving tool 175 has a body 181 that inserts partially into a receptacle 183 in plug 159. A locator sleeve 185 on the exterior of body 181 will land on the rim of receptacle 183. A collet 187 is located within locator sleeve 185 and protrudes below a selected distance. When locator sleeve 185 has landed on the rim of plug 159, collet 187 will be aligned with a groove 189 within the plug 159.

Collet 187 and sleeve 185 are joined to a piston 191. Piston 191 is supplied with hydraulic fluid from ROV 169 (FIG. 10) via one of the stabs 174. A spring 193 is compressed while retrieving tool 175 is in the released position, shown in FIG. 13. Spring 193 urges piston 191 to a lower position. When hydraulic pressure is relieved at passage 192, spring 193 will cause body 181 to move upward to the position shown in FIG. 14. In this position, a wall portion 194 of body 181 will locate directly radially inward of collet 187, preventing collet 187 from disengaging from profile 189. Once retrieving tool 175 is attached to plug 159, ROV 169 will actuate one of the hydraulic stabs or mechanical interfaces 174 to cause stem 173 (FIG. 11) to move upward. Collet 187 causes dogs 163 to be radially retractable during this upward movement as plug 159 is disengaged. Once plug 159 is above tree valve 65, tree valve 65 may be closed, enabling the entire assembly of plug tool 165 to be retrieved to the surface with a lift line.

Field Development

Figure 16:
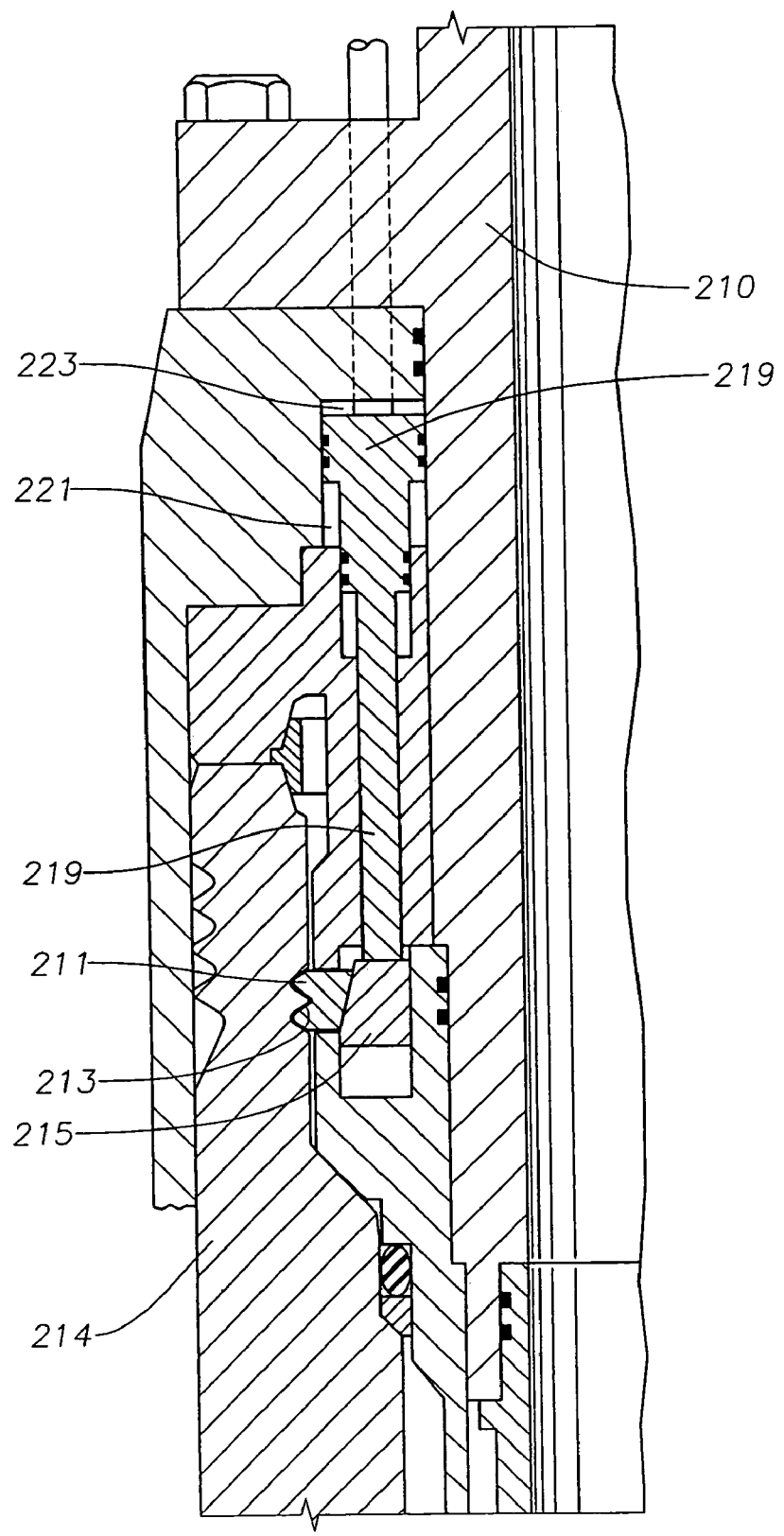
FIG. 16 is a vertical sectional view of an alternate embodiment of the portion of the tree of FIGS. 1A and 1B that connects to the inner wellhead housing.

FIG. 16 schematically illustrates a preferred method for developing a field having a plurality of closely spaced wellhead assemblies 11. This method is particularly useful in water that is sufficiently deep such that a floating platform 195 must be utilized. Platform 195 will be maintained in position over the wells by various conventional means, such as thrusters or moorings. Platform 195 has a derrick 197 with a drawworks 199 for drilling and performing certain operations on the wells. Platform 195 also has a drilling riser 201 that is employed for drilling and casing the wells. Drilling riser 201 is shown connected to high pressure housing 21 of one wellhead assembly 11. Drilling riser 201 has a blowout preventer 203 within it. In the particular operation shown, a string of drill pipe 205 is shown extending through riser 201 into the well.

Platform 195 also preferably has a crane or lift line winch 207 for deploying a lift line 209. Lift line 207 is located near one side of platform 195 while derrick 197 is normally located in the center. Optionally, lift line winch 207 could be located on another vessel that typically would not have a derrick 197. In FIG. 14, a tree 39 is shown being lowered on lift line 209.

Drilling and Completion Operation

In operation, referring to FIG. 8, outer housing 13 along with ring 125 and arm 133 are lowered into the sea. Outer housing 13 is located at the upper end of conductor 15, which is jetted into the earth to form the first portion of the well. As conductor 15 nears the seabed, the entire assembly and arm 133 will be set in the desired position. This position will be selected based on which way the field is to be developed in regard to other wells, manifolds, subsea processing equipment and the like. Once conductor 15 has been jetted into place and later in the subsea construction program, the operator may release lock pins 129 and rotate ring 125 to position arm 133 in a different orientation. This subsequent repositioning of arm 133 is performed as necessary or as field development needs change to optimize connection points for the well flowline jumpers.

Figure 15:
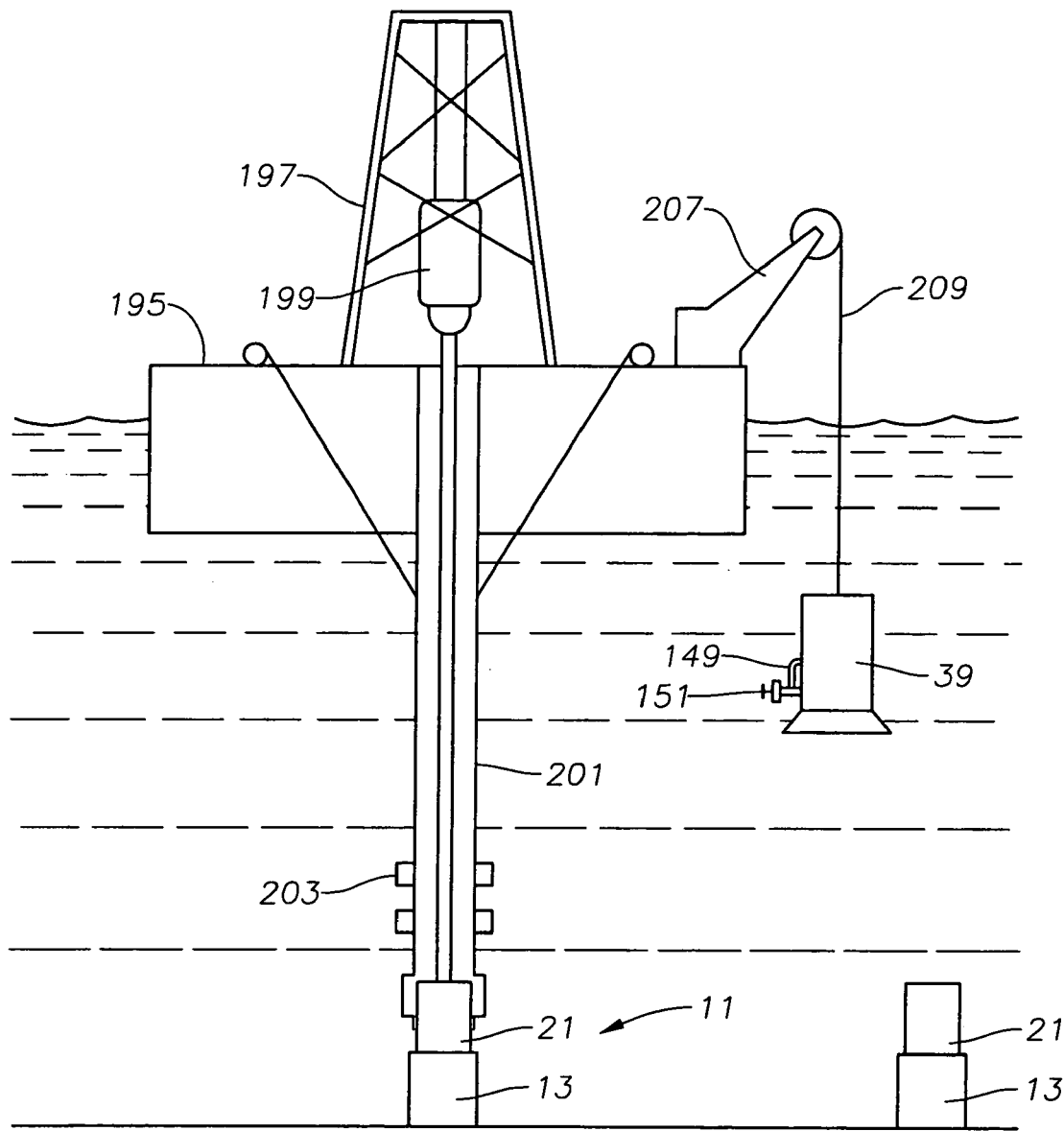
FIG. 15 is a schematic view of a drilling platform in engagement with one subsea wellhead assembly, while a lift line on the platform is in engagement with another subsea wellhead assembly.

The operator then drills the well to a deeper depth and installs casing 117, if such casing is being utilized. Casing 117 will be cemented in the well. The operator then drills to a deeper depth and lowers casing 23 into the well. Casing 23 and high pressure wellhead housing 21 are run on drill pipe and cemented in place. No orientation is needed for inner wellhead housing 21. The operator may then perform the same steps for two or three adjacent wells by repositioning the drilling platform 195 (FIG. 15).

The operator connects riser 201 (FIG. 15) to inner wellhead housing 21 and drills through riser 201 to the total depth. The operator then installs casing 29, which is supported by casing hanger 27. In some cases, an additional string of casing would be installed with the well being drilled to an even greater depth.

The operator is then in position to install tubing hanger 31 (FIG. 1B). First, the operator disconnects drilling riser 201 (FIG. 15) and BOP 203 and suspends it off to one side of wellhead assembly 11. The operator lowers BOP orientation spool 139 on lift line 209 over inner wellhead housing 21, as illustrated in FIG. 8. With the aid of an ROV, socket 143 is positioned to align with pin 137. BOP orientation spool 139 is locked and sealed to inner wellhead housing 21. BOP orientation spool 139 may have been previously installed on an adjacent well left temporarily abandoned.

The operator then attaches drilling riser 201, including BOP 203, (FIG. 15) to mandrel 146 (FIG. 10) of BOP orientation spool 139. The operator lowers tubing 33 and tubing hanger 31 through drilling riser 201 on running tool 111 (FIG. 6), which is attached to a tubing hanger running string, which is a small diameter riser. Once running tool 111 is connected to tubing hanger 31, actuator 117' is preferably stroked to move engaging member 109' downward, thereby causing shuttle sleeve 101 to move downward. This opens tubing annulus passage 83 for upward and downward flow. Running tool 111 has a retractable pin (not shown) that engages BOP orientation spool guide slot 147 (FIG. 8), causing it to rotate tubing hanger 31 to the desired position as it lands within casing hanger 27. Alternatively, the pin mounted on the BOP orientation spool is actuated by ROV to engage the tubing hanger running tool.

After tubing hanger 31 has been set, the operator may test the annulus valve 89 by stroking actuator 117' upward, disengaging engaging member 109 from sleeve 101 as shown in FIG. 6. Spring 115 pushes sleeve 101 to the upper closed position. In this position, valve head seal 99 will be engaging sleeve seat 103, blocking flow in either the upward or downward direction. While in the upper position, detent split ring 105 engages groove 107, preventing any downward movement.

The operator then applies fluid pressure to passage 118' within running tool 111. This may be done by closing the blowout preventer in drilling riser 201 on the small diameter riser above running tool 111. The upper end of passage 118' communicates with an annular space surrounding the small diameter riser below the blowout preventer in drilling riser 201. This annular space is also in communication with one of the choke and kill lines of drilling riser 201. The operator pumps fluid down the choke and kill line, which flows down passage 118' and acts against sleeve 101. Split ring 105 prevents shuttle sleeve 101 from moving downward, allowing the operator to determine whether or not seals 99 on valve head 97 are leaking.

The well may then be perforated and completed in a conventional manner. In one technique, this is done prior to installing tree 39 by lowering a perforating gun (not shown) through the small diameter riser in the drilling riser 201 (FIG. 15) and through tubing 33. The smaller diameter riser may optionally include a subsea test tree that extends through the drilling riser.

If desired, the operator may circulate out heavy fluid contained in the well before perforating. This may be done by opening tubing annulus valve 89 by stroking actuator 117' and engaging member 109' downward. Engaging member 109' releases split ring 105 from groove 107 and pushes sleeve 101 downward to the open position of FIG. 7. A port such as a sliding sleeve (not shown) at the lower end of tubing 33 is conventionally opened and the blowout preventer in drilling riser 201 is closed around the tubing hanger running string. The operator may circulate down the running string and tubing 33, with the flow returning up tubing annulus 85 into drilling riser 201 and up a choke and kill line. Reverse circulation could also be performed.

After perforating and testing, the operator will set plug 159 (FIG. 12) in profile 157 (FIG. 11) in tubing hanger production passage 32. Tubing annulus valve 89 is closed to the position of FIG. 6 by stroking actuator 117' upward, causing spring 115 to move sleeve 101 upward. The operator then retrieves running tool 111 on the running string through the blowout preventer and drilling riser 201. The downhole safety valve (not shown) in tubing 33 is above the perforations and is preferably closed to provide a first pressure barrier; plug 159 in tubing hanger production passage 32 providing a second pressure barrier. Tubing annulus 85 normally would have no pressure, and tubing annulus valve 89 provides a second (temporary) barrier in addition to the primary barriers to wellbore pressure, these being the production tubing itself and the production packer in the tubing completion system.

The operator then retrieves running tool 111 (FIG. 6) on the small diameter riser. The operator releases drilling riser 201 and BOP 203 from BOP orientation spool 139 (FIG. 8) and retrieves BOP orientation spool 139 on lift line 209 (FIG. 15) or deploys BOP orientation spool 139 on an adjacent well. The operator may then skid platform 195 sequentially over the other wells for performing the same functions with BOP orientation spool 139 and drilling riser 201 for a different well. Once tubing 29 has been run and perforated on a particular well, there is no more need for drilling riser 201 or derrick 197 (FIG. 15) at that location. Even though platform 195 may have skidded out of alignment with the particular well (as an example, to continue operations on an adjacent well location), an ROV can guide lift line 209 down to engage and retrieve or move BOP orientation spool 139 in order to enable recovery to surface or else movement to yet another adjacent well, within working proximity.

The operator is now in position for running tree 39 on lift line 209 (FIG. 15). Tree 39 orients to the desired position by the final engagement of the orienting members 44 and 46 (FIG. 3). This positions tree connector 151 in alignment with flowline connector 153, if such had already been installed, or at least in alignment with socket 127. Flowline connector 153 could be installed after installation of tree 39, or much earlier, even before the running of high pressure wellhead housing 21. As tree 39 lands in wellhead housing 21, its lower end will move into bore 25 of wellhead housing 21, and isolation tube 43 will stab into production passage 32 of tubing hanger 31. While being lowered, orientation member 44 engages orientation sleeve 46 to properly orient tree 39 relative to tubing hanger 31. Once landed, the operator supplies hydraulic fluid pressure to cam sleeve 55, causing dogs 53 to push locking element 51 (FIG. 2) to the outer engaged position with profile 35. Flowline connector 151 (FIG. 1B) of tree 39 aligns with flowline connector 153, and the tubing annulus passage (not shown) in tree 39 is connected to a manifold or a related facility.

Figure 12:
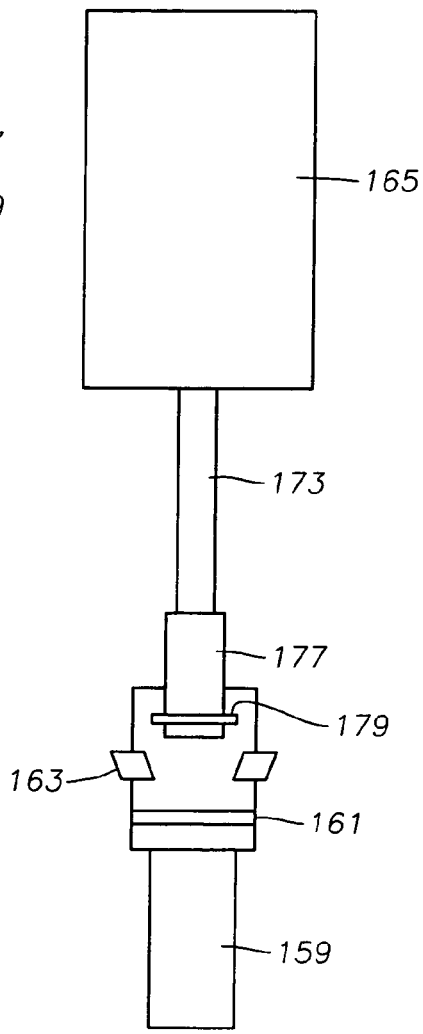
FIG. 12 is a schematic side view of the plug tool of FIG. 11, with a plug setting attachment.

Referring to FIGS. 11–13, in a preferred technique, with lift line 209 (FIG. 15) and the assistance of ROV 169, the operator connects plug tool 165 to tree mandrel 81 and removes plug 159 in tubing hanger 31 with retrieval tool 175. Tree valve 65 is closed once plug 159 is above it. Plug tool 165 may be retrieved and a tree cap installed, typically using ROV 169. Tree 39 should be ready for production.

Referring to FIG. 5, during production, tubing annulus valve 89 may remain closed, but is typically held open for monitoring the pressure in tubing annulus 85. If tubing annulus valve 89 is closed, it can be opened at any time by stroking actuator 117 (FIG. 5) of tree 39 downward. Any pressure within tubing annulus 85 is communicated through tubing annulus passage 118 in tree 39 and to a monitoring and bleedoff facility.

For a workover operation that does not involve pulling tubing 33, a light weight riser with blowout preventer may be secured to tree mandrel 81. An umbilical line would typically connect the tubing annulus passage on tree 39 to the surface vessel. Wireline tools may be lowered through the riser, tree passage 41 and tubing 33. The well may be killed by stroking actuator 117 (FIG. 5) downward to open tubing annulus valve 89. Circulation can be made by pumping down the riser, through tubing 33, and from a lower port in tubing 33 to tubing annulus 85. The fluid returns through tubing annulus passage 83 and passage 118 in tree 39 to the umbilical line.

For workover operations that require pulling tubing 33, tree 39 must be removed from wellhead housing 21. A lightweight riser would not be required if tubing hanger plug 159 (FIG. 12) is reset into profile 157 of tubing hanger 31 with plug tool 165 (FIG. 11). The operator installs plug tool 165 using lift line 209 (FIG. 15) and ROV 169. Plug 159 is attached to stem 173 and retrieval tool 177 and lowered into profile 157. Once locking elements 163 latch into profile 157, the operator releases retrieval tool 177 from plug 159. The downhole safety valve in tubing 33 typically would be closed during this operation. Tree 39 is retrieved on lift line 209 with the assistance of ROV 169. Then, drilling riser 201 (FIG. 15) is lowered into engagement with inner wellhead housing 21. The operator retrieves tubing 33 and performs the workover in a conventional manner.

Alternate Embodiment

FIG. 16 shows an alternate embodiment for the internal connector portions of a tree 210. Tree 210 is the same as tree 39, but for its connecting mechanism. Tree 210 has a plurality of dogs 211 that move radially inward and outward between retracted and extended positions. Dogs 211 engage an internal profile 213 located within the bore of wellhead housing 214. A cam 215, when moved axially upward, causes dogs 211 to move radially outward.

Cam 215 is secured to a plurality of rods 217. Rods 217 lead to an annular piston 219, or else a plurality of hydraulic cylinders externally mounted. Piston 219 has a lock chamber 22 that causes it to move upward when supplied with hydraulic fluid pressure, moving cam 215 to the upper position. Piston 219 also has an unlocking chamber 223. When supplied with hydraulic fluid pressure, the pressure in unlocking chamber 223 forces piston 219 downward to free dogs 211 to retract. Preferably the taper between cam 215 and dogs 211 is a locking taper so that cam 215 will not move downward if hydraulic pressure fails.

Flowline Jumpers

Figure 9:
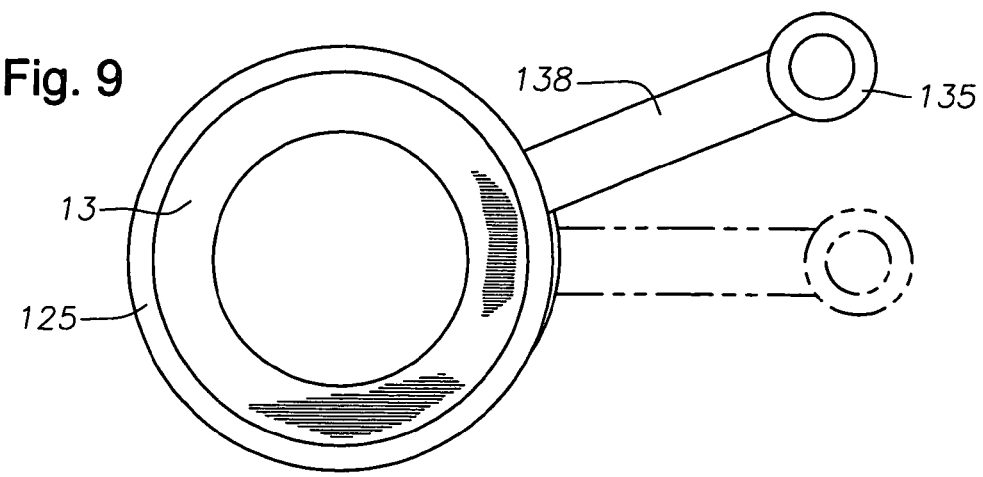
FIG. 9 is a schematic horizontal sectional view of the wellhead housing of FIG. 8, the dotted lines showing a flowline connector arm being rotated.
Figure 17:
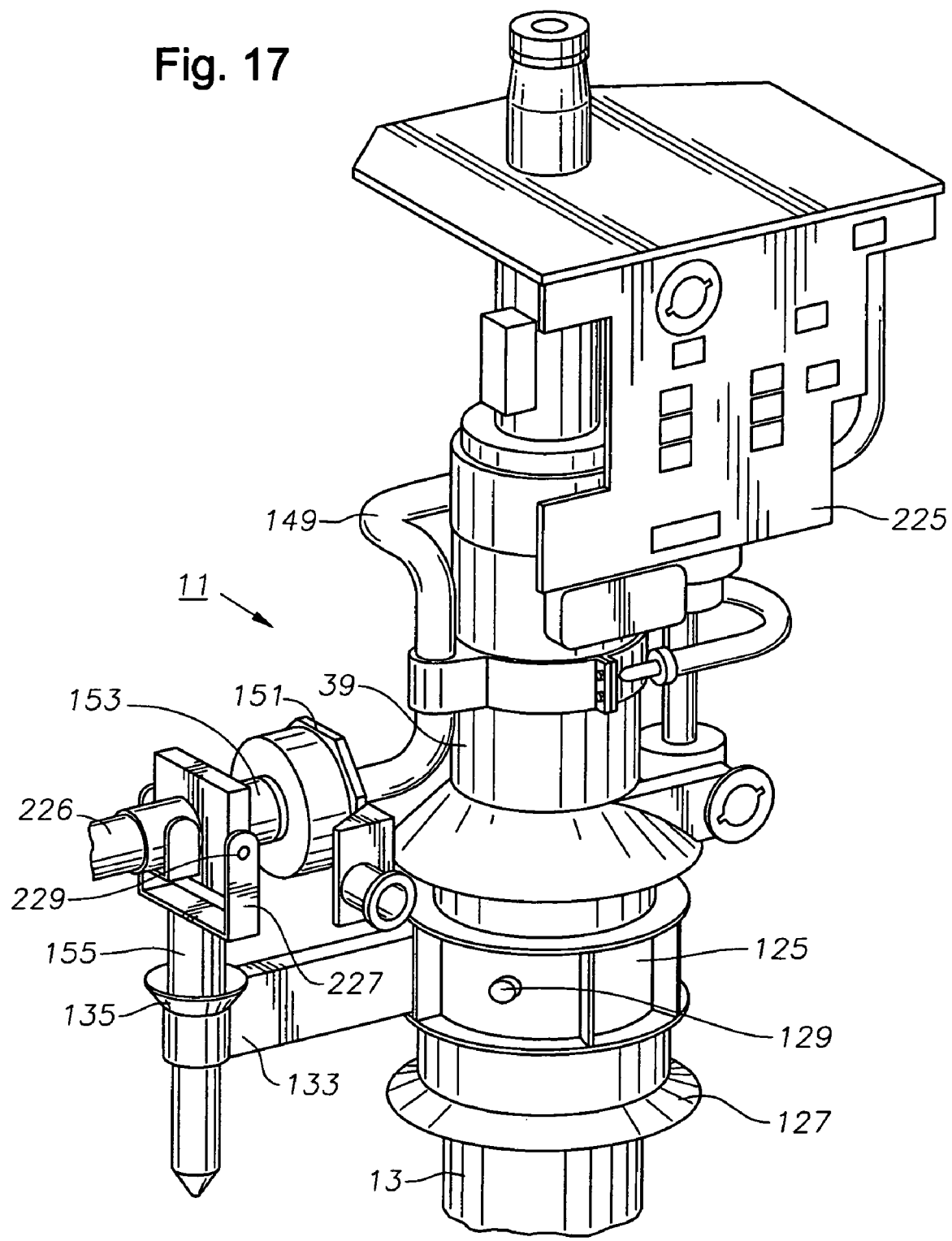
FIG. 17 is a perspective view of the wellhead assembly of FIGS. 1A and 1B, with a tree installed thereon.

FIG. 17 shows tree 39 installed, tree 39 typically having a control assembly 225 mounted to it for controlling various valves (not shown) mounted to the tree. Alternately, the control of the various valves may be handled in a control center separate from tree 39. The valves control the flow of fluids within and from tree 39. Flowline coupling 153 is aligned in position to mate with tree coupling 151. Couplings 153, 151 may be of variety of types including collet, clamp, flange or other types. Flowline coupling 153 is mounted to one end of a flowline jumper 226. Tree flowline connector 151 will have been previously oriented in a desired direction as discussed in connection with FIGS. 8 and 9.

Figure 18:
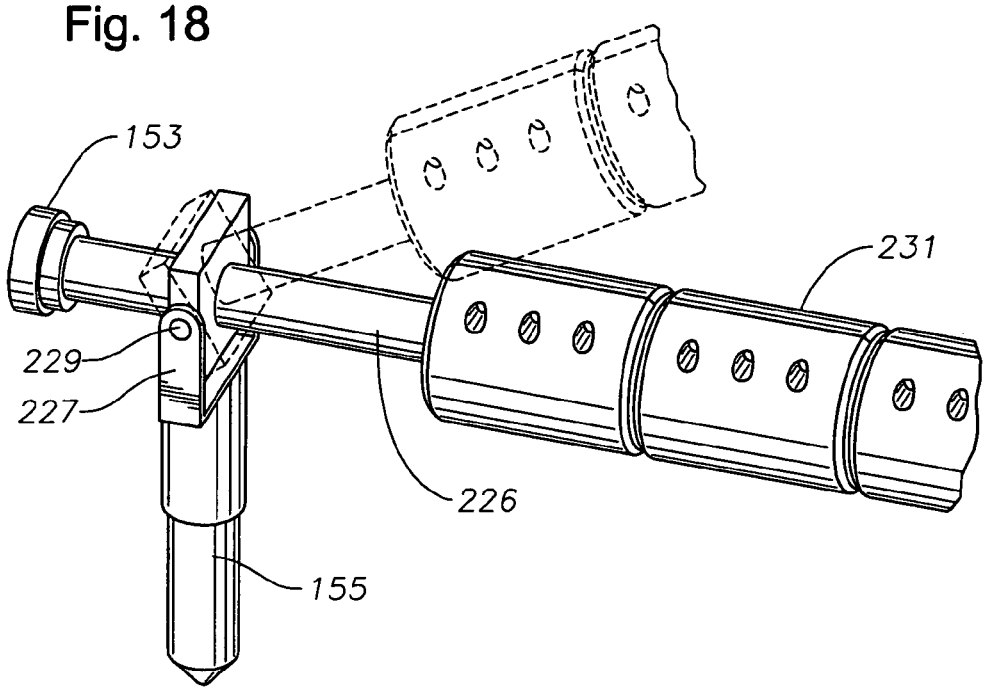
FIG. 18 is an enlarged perspective view of one connector of a flowline jumper for connecting to the tree of FIG. 1.

Mandrel 155 extends from flowline coupling 153 for reception within socket 135. Mandrel 155 positions flowline coupling 153 in alignment with tree coupling 151 when jumper 226 is lowered into the sea from the surface. As shown also in FIG. 18, a hinge mechanism 227 connects flowline coupling. 153 and mandrel 155 to flowline jumper 226. Hinge mechanism 227 allows flowline jumper 226 to move to a position parallel to mandrel 155, as illustrated by the dotted lines. In the connected position, coupling 153 is 90° relative to mandrel 155. Hinge mechanism 227 may be of a variety of types, and in this embodiment, hinge mechanism 226 comprises a clevis and a pair of pins 229 that rotate within holes in the clevis.

Figure 19:
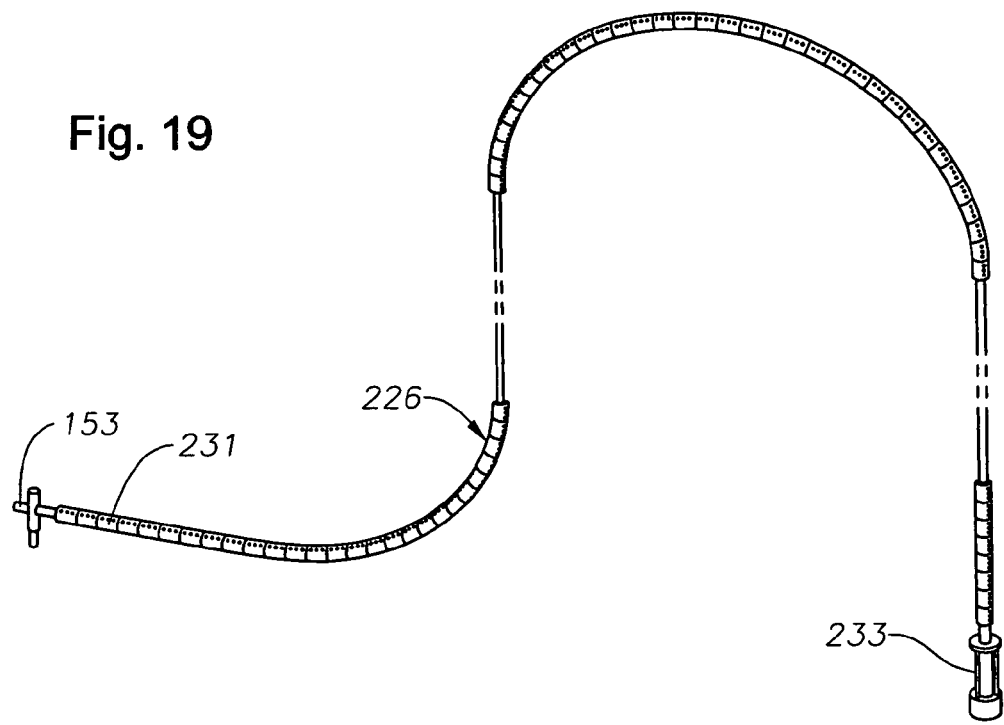
FIG. 19 is a perspective view of the flowline jumper of FIG. 18.

Referring to FIG. 19, flowline jumper 226 may be a single integral conduit or a number of sections secured together, such as by threads, flanged ends, or welding. Flowline jumper 226 may be of carbon steel along with a number of other alloys such as titanium and chrome. Flowline jumper 226 may also be formed at least partially of composite materials such as fiber in a resin. Flowline jumper 226 may be pre-bent into an arcuate configuration or it may be sufficiently flexibly to curve into the arcuate configuration when lowered. Furthermore, flowline jumper 226 could be formed of flexible pipes that are made of multiple articulated components that flex relative to each other. Flowline jumper 226 may have a single passage through it or multiple passages.

Flowline jumper 226 also has at least a portion that is buoyant. In this embodiment, a plurality of short buoyant segments 231 are secured over flowline jumper 226, forming a buoyant jacket. As shown in FIG. 19, segments 231 need not extend the full length of flowline jumper 226. However, they should extend sufficiently to cause the arcuate central section to float in a vertical plane. If not pre-bent into an arcuate shape, the length of flowline jumper 226 relative to its diameter will cause a portion to flex into an arcuate shape due to buoyancy even if the conduit of flowline jumper 226 is of steel. The flexibility of flowline jumper 226 is preferably sufficient to avoid any permanent deformation due to the buoyancy of buoyant members 231. The buoyancy should be adequate to provide buoyancy to the arcuate portion of jumper 226 whether filled with water, hydrocarbon liquid or gas. Segments 231 may serve as bend restrictors to prevent excessive bending of the conduit of flowline jumper 226.

A vertical connector 233 is located on the end opposite connector 153. Connectors 233 and 153 are preferably negatively buoyant for ease in installation. Connector 233, like connector 153, may be of a variety of types. When flowline jumper 226 is installed, a portion extending from connector 153 will be horizontal and a portion extending from vertical connector 233 will be vertical. Buoyant members 231 cause the curved portion adjacent vertical connector 233 to extend upward within a vertical plane. The combination of the horizontal portion and arcuate portion over the length of jumper 226 may be termed a lazy wave.

FIGS. 20–27 illustrate one method for connecting wellhead assembly 11 to a second component, which in this case is a subsea manifold 235. The same method could be used for connecting manifold 235 to other subsea components, such as a subsea fluid processing unit. The second component 235 could also be another flowline, or a daisy chain to another well. Manifold 235 receives flow from a number of subsea wells and routes that flow to further processing equipment. The second component 235 could include such equipment normally mounted to tree 39 (FIG. 1A), such as a choke, production/injection flow isolation valve, multiphase flow meters, erosion monitoring, corrosion monitoring and pressure and temperature monitoring. The connection of flowline jumper 226 to subsea wellhead assembly 11 could occur any time after running of low pressure wellhead housing 13.

The length of jumper 226 is greater than the horizontal distance between wellhead assembly 11 and manifold 235. The additional length is sufficient for the lazy wave configuration shown in FIGS. 19 and 27, however the precise configuration and the additional length of jumper 226 over the actual horizontal distance is not critical. The distances between wellhead assembly 11 and manifold 235 may vary and could be typically as short as 30 meters and as long as several kilometers.

Figure 20:
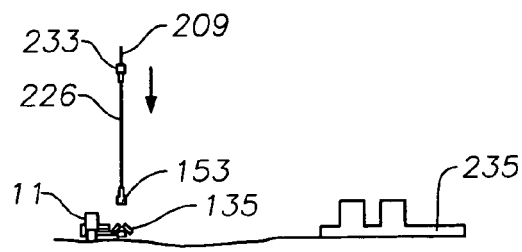
FIG. 20 is a schematic view of the flowline jumper of FIG. 18, shown being lowered into the sea.

As shown in FIG. 20, lift line 209 is secured to one of the ends of flowline jumper 226. In this embodiment, it is shown secured to second connector 233. The negative buoyancy of first connector 153 has caused it to assume a lower elevation than any other portion of jumper 23 as it is being lowered. Also, the negative buoyancy has caused mandrel 155 to hinge over to an orientation parallel with flowline jumper 226. Flowline jumper 226 is essentially straight and vertical in the positions of FIGS. 20–23.

Figure 21:
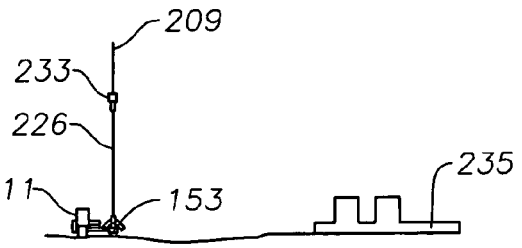
FIG. 21 is a schematic view of the flowline jumper of FIG. 18, shown being stabbed into the tree flowline connector.
Figure 22:
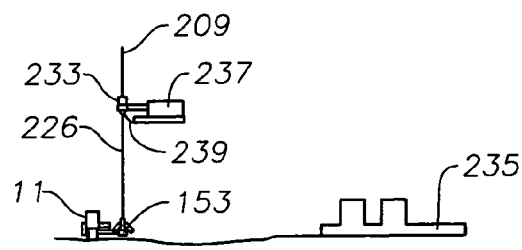
FIG. 22 is a schematic view of the flowline jumper of FIG. 18, showing a remote operated vehicle in the process of connecting to the flowline jumper.
Figure 23:
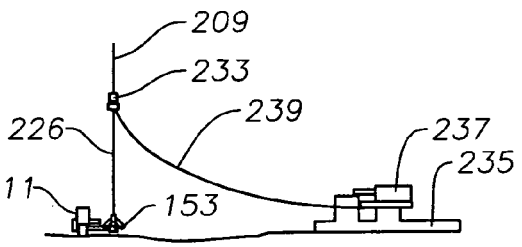
FIG. 23 is a schematic view of the flowline jumper of FIG. 18, showing the ROV landed on a subsea manifold and connected by a pull line to the flowline jumper.
Figure 24:
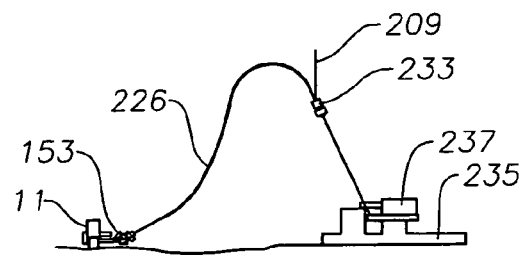
FIG. 24 is a schematic view of the flowline jumper of FIG. 18, showing the pull line being retracted by the ROV, drawing the second connector of the flowline jumper into alignment with the manifold.
Figure 25:
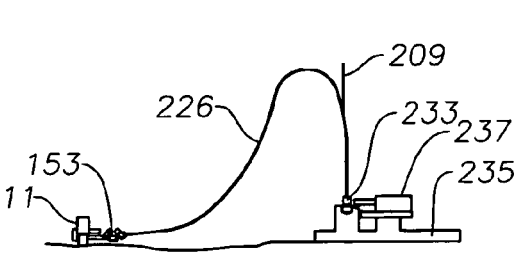
FIG. 25 is a schematic view of the flowline jumper of FIG. 18, showing the second connector of the flowline jumper being connected to the subsea manifold.
Figure 26:
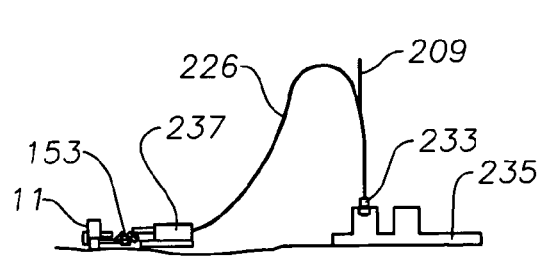
FIG. 26 is a schematic view of the flowline jumper of FIG. 18, showing the remote operated vehicle connecting the couplings of the flowline jumper and the tree to each other.

In FIG. 21, mandrel 155 (FIG. 17) is shown stabbing into socket 135 while lift line 209 is still attached. Remote cameras may be used for guiding mandrel 155 into socket 135. Referring to FIG. 22, while flowline jumper 226 is still vertical, an ROV 237 is shown optionally attaching a pull line 239 to vertical connector 233. As shown in FIG. 23, ROV 237 reels out pull line 239 and lands on manifold 237. Lift line 209 still maintains flowline jumper 226 in the vertical orientation in FIG. 23. Then, as shown in FIG. 24, ROV 237 reels in pull line 239, causing second connector 233 to approach manifold 235, with lateral guidance where necessary. Hinge mechanism 227 (FIG. 18) allows first connector 153 and a portion of flowline jumper 226 to move to a horizontal position. FIG. 25 shows ROV 237 connecting second connector 233 to a suitable mandrel on manifold 235. Subsequently, as shown in FIG. 26, ROV 237 moves over into engagement with first connector 153. ROV 237 performs the actuation to cause first connector 153 to sealingly engage and secure to tree coupling 151 (FIG. 1A).

Figure 27:
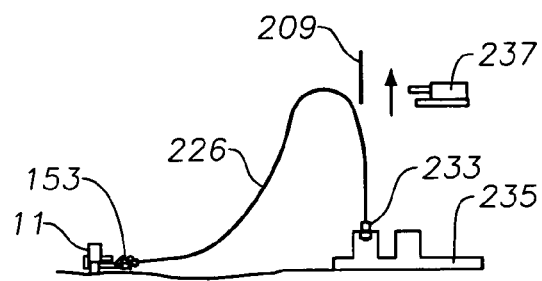
FIG. 27 is a schematic view of the flowline jumper of FIG. 18, showing the installation completed and the ROV being retrieved.

FIG. 27 illustrates flowline jumper 226 in the desired position, with lift line 209 removed and being retrieved as well as ROV 237. Buoyant members 231 (FIG. 19) cause the arcuate portion of flowline jumper 226 to float in a vertical plane after installation.

Figure 28:
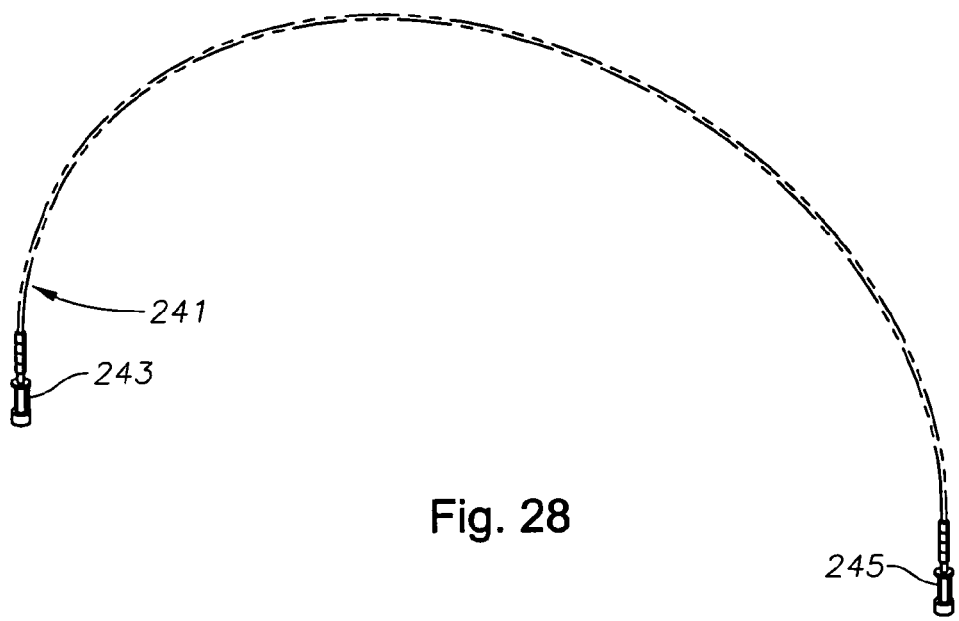
FIG. 28 is a perspective view of a second embodiment of a flowline jumper.

In the embodiment of FIG. 28, flowline jumper 241 may be constructed in the same manner as flowline jumper 226 (FIG. 19). It may contain a buoyant jacket (not shown) over all of its length or a portion. Both connectors 243, 245 are vertical types such as connector 233 (FIG. 19). Consequently, the buoyancy of flowline jumper 241 causes the single arcuate configuration to float in a vertical plane after installation.

Subsea Processing System

Figure 29:
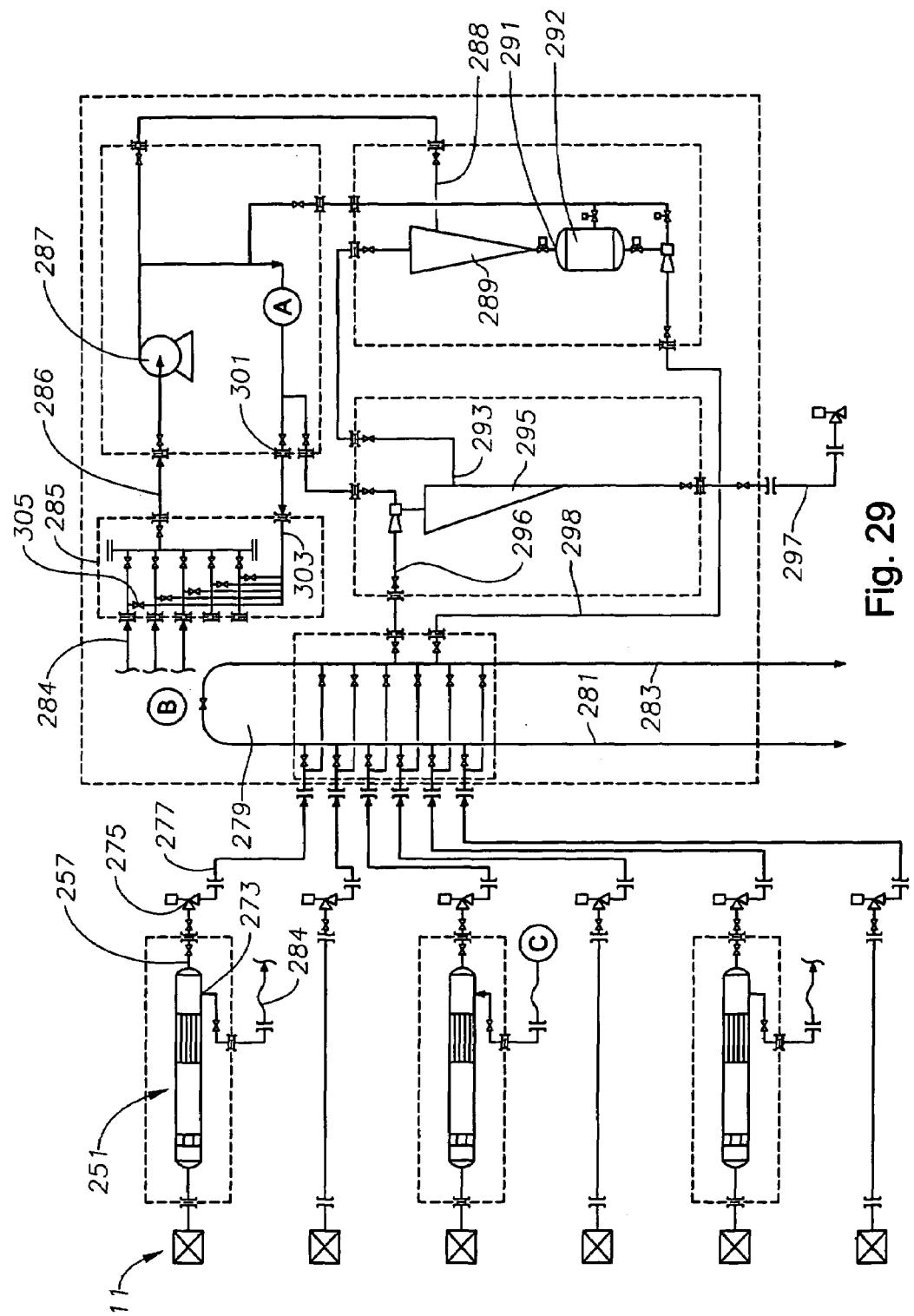
FIG. 29 is a schematic of a production system for the wellhead assembly of FIGS. 1A and 1B.

FIG. 29 illustrates schematically a subsea processing system for the various wellhead assemblies 11 within a field. The subsea processing system separates water and sand from the oil being produced. The system includes a plurality of separators 251. A single separator 251 may be utilized with each subsea well assembly 11, or more than one well 11 may feed into a separator 251, typically via a gathering system (manifold).

As shown in FIG. 30, each separator comprises a horizontal cylindrical vessel 253 that locates on the sea floor. Oil and water inlet 255 is located on the upstream end of separator vessel 253. Oil outlet 257 is located on the downstream end of separator vessel 253. Generally, greater water depths will require a higher wellhead delivery pressure with corresponding lower actual free gas volumes. Lower free gas volumes are beneficial for oil/water separation, because fewer gas bubbles will migrate vertically and disturb the horizontal flow pattern generated by the oil and water flowing through the separator vessel 253. A low free gas percentage in the fluid also allows more of the separator vessel to be utilized for oil/water separation.

In addition to the issue described above, higher pressure in itself within separator vessel 253 will impact the separation. Preliminary results show that separation occurs easier at higher pressures. This can be caused by the fact that high pressure causes the liquid hydrocarbon fraction to be lighter, hence increase the density difference between water and oil. The hydrocarbon fraction becomes lighter because lighter hydrocarbon fractions are liquefied at the higher pressure, reducing the overall density of the liquid hydrocarbon phase.

Separator vessel 253 is designed to withstand the high external pressures due to the very deep water. Also, one may not reduce the maximum theoretical external pressure by anticipated internal pressure in the design calculations. Generally, smaller diameters will allow a thinner wall thickness for the same external pressure. For example, a 2.8 meter diameter cylinder requires 140 millimeters wall thickness to withstand a selected pressure. A 0.5 meter diameter cylinder will withstand the same pressure with a wall thickness of 25 millimeters. Consequently, separator 253 has a fairly small diameter, preferably no more than $\frac{1}{10}^{th}$ its length.

Separator 251 may be of various types for separating water and oil. In this embodiment, separator 259 employs a coalescence unit 259. Coalescence unit 259 has a plurality of tubes 261 within it, each of the tubes being at an electrical potential, as illustrated in FIG. 31. A high voltage electrostatic field is applied to the oil and water mixture at the tubes 261. By exposing the mixture of water and oil to an electrostatic field, the dipolar water droplets contained in the oil phase are oriented in a way that makes them collide or coalesce with each other. This causes the water droplets to grow to bigger droplets. Generally, bigger droplets move and separate faster than smaller droplets. Consequently, a first separation from water and oil takes place immediately after coalescence unit 259. This reduces the required retention time to remove water from the oil produced over a pure gravity separation, allowing the separator vessel 253 diameter and volume to be reduced.

As shown in FIG. 31, preferably low voltage supplied from the surface via an umbilical line is routed through low voltage wires 263 into the interior of separator vessel 253. A plurality of transformers 265 transform the low voltage to the high voltage that is required for the electrostatic field. The same low voltage power supply is utilized for other functions, such as operating the solenoids and sensors involved with control 225 (FIG. 17) of each subsea well 11.

If coalescence unit 259 is not adequate to reach the desired water separation performance, a second separator unit could be employed. The second stage could be another coalescence unit or it could be a unit of a different type, such as dielectrophoresis unit 267. Unit 267 also uses a high voltage electrostatic field, however the field is configured to force the water droplets into designated sections of unit 267 and thereby form streams of water. Electrodes 269 in the form of undulating sheets 269, as shown in FIGS. 32 and 33, are used. Electrode sheets 269 are closely spaced and arranged side-by-side to define constrictive passage portions and widened passage portions. The constrictive passage portions result from two adjacent valleys, while the widened passage portions result from two adjacent peaks of each electrode sheet 269. Sheets 269 force the water droplets to move towards the stronger section of the electrostatic field, which is at the narrower portions. The forces imposed by the electrostatic field is in the order of magnitude two to five times greater than the gravity force. This phenomenon is used to guide the water droplets into these predetermined passage portions, where they form high water content sections of liquid that will easily separate immediately downstream of unit 267. Dielectrophoresis unit 267 reduces the time normally needed for a conventional gravity separator.

Referring again to FIG. 30, a bulkhead 271 extends upward from separator vessel 253 near its downstream end. Bulkhead 271 has a height about half the diameter of separator vessel 253, thus defines a lower section for collecting higher water concentrations. A water outlet 273 is located on the bottom of separator vessel 253 upstream of bulkhead 271.

Referring back to FIG. 29, a choke 275 is preferably located downstream of oil outlet 257. Choke 275 is a conventional device that provides a variable orifice for controlling pressure and flow rate. In the prior art, a choke is typically located on the tree, thus upstream of any separation process. In this embodiment, choke 275 is located downstream of each separator 251 to prevent shearing and mixing of oil and water.

A flowline jumper 277 connects choke 275 to manifold 279. Flowline jumper 277 may be constructed the same as jumper 226 (FIG. 19) or jumper 241 (FIG. 28) or may be of more conventional form. Choke 275 could be incorporated as part of flowline jumper 277 such that it is lowered and installed with jumper 277. Alternately, choke 275 could be mounted to manifold 279 or other subsea equipment.

Manifold 279 is depicted as a conventional unit that has a pair of lines 281 and 283 that lead to the surface for delivery of the separated oil and any entrained gas therein. Jumpers 277 of each of the various separators 251 lead to manifold 279. In this embodiment, the separated water outlet 273 of each separator connects to a flowline 284 that leads to a valve module 285. The various flowlines 284 join each other in valve module 285, with the combined flow leading from a line 286 to the intake of a subsea pump 287. Water pump 287 disposes of the water in an injection well. A variety of equipment may be connected between water pump 287 and the injection well. In this example, pump output line 288 leads to a hydrocyclone or centrifugal separator 289 that separates sand from the liquid stream that has been produced from the wells. Hydrocyclone separator 289 has a sand output 291 that leads to a storage vessel 292 for periodic later disposal. For example, the sand could be pumped back into the casing annulus of one or more of the subsea wellhead assemblies 11. Vessel 292 is shown connected to manifold 283 via line 298. Periodically, the high pressure output of pump 287 is directed into vessel 292, as indicated, to cause the accumulated sand to move through line 298.

The liquid output 293 of hydrocyclone separator 289 leads to another oil/water separator 295 that is of a centrifugal or hydrocyclone type for removing any final oil droplets located in the water stream. The separated oil leads through line 296 to the manifold line 283. The water output of separator 295 must be substantially free of oil and leads to an injection flowline 297 for delivery to an injection well.

A valve 301 is connected to a line 303 that leads from the output of pump 287. Line 303 branches into separate lines, each connected to one of the lines 284 leading from one of the separators 251. Each line 303 has a valve 305. Opening valves 301 and 305 enables the liquid being pumped by pump 287 to flow backwards through one of the water outlet lines 284 into the water outlet 273 for backflushing. Sand and other deposits accumulate in the subsea separation vessels 253. These sands and/or deposits are removed from each separator 251 by the backflushing injection through lines 284. The injection of water creates turbulence within each separator vessel 253 to cause the trapped sand and other deposits in separator 251 to flow with the produced oil out manifold lines 281 and 283. Normally, backflushing fluid is delivered to only one separator 251 at a time.

The invention has significant advantages. The use of a light weight tree allows a lift line to be used to lower the tree onto the wellhead housing. The use of the lift line frees up the derrick and drawworks for use in drilling or completing another well simultaneously. The ROV actuated plug removal tool allows plugs to be pulled and set without the use of a riser. The tubing annulus valve allows circulation without removing plugs or requiring a dual string completion riser. The orientation equipment and method allows changes in the orientation flowline jumper to be made after installation on the outer wellhead housing. Locating the choke downstream of a subsea separator provides higher pressure in the separator, which enhances separation. Selective back flushing of the separators permits discharge of solids and deposits from the system in a controlled a non-disruptive manner.

While the invention has been shown in only a few of its forms, it should be apparent to those skilled in the art that it is not so limited but is susceptible to various changes without departing from the scope of the invention.

What is claimed is:

1. A method of drilling and completing a plurality of subsea wells, comprising:
   (a) with a well drilling derrick assembly on a floating platform, connecting a drilling riser to a first wellhead housing, drilling and casing a first well, then running a string of tubing and landing a tubing hanger in the first wellhead housing;
   (b) with the well drilling derrick assembly on the floating platform, disconnecting the drilling riser from the first wellhead housing, connecting the drilling riser to a second wellhead housing, and performing operations on a second well; and
   (c) while performing at least part of the operations on the second well in step (b), connecting to a production tree lift line from a lift line winch that is on the same floating platform and spaced away from the well drilling derrick assembly, and lowering the production tree on the lift line to the first wellhead housing and connecting the tree to the first wellhead housing.

2. The method according to claim 1, wherein:
   during step (a) the well drilling derrick assembly of the platform is located over the first wellhead housing; and
   (b) the platform is moved from the position in step (a) after the drilling riser is 3. The method according to claim 1, wherein step (a) further comprises perforating the first well and setting a plug within the tubing hanger.

4. A method of drilling and completing a plurality of subsea wells, comprising:
   (a) with a floating platform, connecting a drilling riser to a first wellhead housing, drilling and casing a first well, then running a string of tubing and landing a tubing hanger in the first wellhead housing;
   (b) with the floating platform, disconnecting the drilling riser from the first wellhead housing, connecting the drilling riser to a second wellhead housing, and performing operations on a second well;

(c) while performing at least part of step (b), lowering a production tree on a lift line from the same floating platform and connecting the tree to the first wellhead housing;
wherein step (a) further comprises perforating the first well and setting a plug within the tubing hanger;
wherein the method further comprises after step (c):
lowering a plug removal tool on the lift line and landing the plug removal tool on the tree;
removing the plug with the plug removal tool; then
disconnecting the plug removal tool from the tree and retrieving the plug removal tool on the lift line.

5. A method of drilling and completing a plurality of subsea wells, comprising:
step (a) with a floating platform, connecting a drilling riser to a first wellhead housing, drilling and casing a first well, then running a string of tubing and landing a tubing hanger in the first wellhead housing;
(b) with the floating platform, disconnecting the drilling riser from the first wellhead housing, connecting the drilling riser to a second wellhead housing, and performing operations on a second well;
(c) while performing at least part of step (b), lowering a production tree on a lift line from the same floating platform and connecting the tree to the first wellhead housing; wherein:
step (a) further comprises providing the tubing hanger with a tubing annulus valve and closing the tubing annulus valve prior to disconnecting the drilling riser from the first wellhead housing; and
step (c) further comprises selectively opening the tubing annulus valve after the tree lands on the first wellhead housing.

6. A method of drilling and completing a plurality of subsea wells, comprising:
(a) with a floating platform, connecting a drilling riser to a first wellhead housing, drilling and casing a first well, then running a string of tubing and land a tubing hanger in the first wellhead housing;
(b) with the floating platform, disconnecting the drilling riser from the first wellhead housing, connecting the drilling riser to a second wellhead housing, and performing operations on a second well;
step (c) while performing a least part of step (b), lowering a production tree on a lift line from the same floating platform and connecting the tree to the first wellhead housing; wherein:
step (a) further comprises providing the tubing hanger with a tubing annulus valve that closes due to a spring bias prior to disconnecting the drilling riser from the first wellhead housing; and
step (c) further comprises providing the tree with a hydraulically powered actuator, and opening the tubing annulus valve with the actuator after the tree lands on the first wellhead housing.

7. A method of drilling and completing a plurality of subsea wells, comprising:
(a) with a floating platform, connecting a drilling riser to a first wellhead housing, drilling and casing a first well, then running a string of tubing and landing a tubing hanger in the first wellhead housing;
(b) with the floating platform, disconnecting the drilling riser from the first wellhead housing, connecting the drilling riser to a second wellhead housing, and performing operations on a second well;
(c) while performing at least part of step (b), lower a production tree on a lift line from the same floating platform and connecting the tree to the first wellhead housing; wherein step (a) further comprises:
providing the tubing hanger with an orientation member and rotating the tubing hanger to a desired orientation; and step (c) further comprises:
providing the tree with an orientation member and engaging the orientation member of the tree with the orientation member of the tubing hanger to rotate the tree in a desired final orientation.

8. A method of drilling and completing a plurality of subsea wells, comprising:
(a) with a floating platform, connecting a drilling riser to a first wellhead housing, drilling and casing a first well, then running a string of tubing and landing a tubing hanger in the first wellhead housing;
(b) with the floating platform, disconnecting the drilling riser from the first wellhead housing, connecting the drilling riser to a second wellhead housing, and performing operations on a second well;
(c) while performing at least part of step (b), lowering a production tree on a lift line from the same floating platform and connecting the tree to the first wellhead housing;
(d) providing the tree with a flowline connector and rotating the tree to a desired orientation, while it is landing on the first wellhead housing; and
(e) connecting a flowline jumper to the flowline connector and to additiona subsea equipment.

9. A method of drilling and completing a plurality of subsea wells, comprising:
(a) with a floating platform, connecting a drilling riser to a first wellhead housing, drilling and casing a first well, then running a string of tubing and land a tubing hanger in the first wellhead housing;
(b) with the floating platform, disconnecting the drilling riser from the first wellhead housing, connecting the drilling riser to a second wellhead housing, and performing operations on a second well;
(c) while performing at least part of step (b), lowering a production tree on a lift line from the same floating platform and connecting the tree to the first wellhead housing;
(d) providing the tree with a flowline connector; and
(e) connecting a flowline jumper to the flowline connector and to additional subsea equipment, the flowline jumper having an arcuate portion that is sufficiently buoyant to float in a vertical plane after installation.

10. A method of drilling and completing a plurality of subsea wells, comprising:
(a) with a floating platform, connecting a drilling riser to a first wellhead housing, drilling and casing a first well, then running a string of tubing and land a tubing hanger in the first wellhead housing;
(b) with the floating platform, disconnecting the drilling riser from the first wellhead housing, connecting the drilling riser to a second wellhead housing, and performing operations on a second well;
(c) while performing at least part of step (b), lowering a production tree on a lift line from the same floating platform and connecting the tree to the first wellhead housing;
(d) connecting a subsea fluid separator to a subsea manifold having flowlines leading to a surface processing facility;
(e) connecting a flowline jumper from the tree to the subsea fluid separator;

(f) connecting a choke between the separator and the subsea manifold; and (g) flowing well fluid from the tree to the separator, separating heavier and lighter components of the well fluid in the separator, and reducing pressure of the flowing well fluid product as the well fluid flows through the choke to the manifold for transport to the surface facility.

* * * * *

UNITED STATES PATENT AND TRADEMARK OFFICE
CERTIFICATE OF CORRECTION

PATENT NO. : 6,968,902 B2
DATED : November 29, 2005
INVENTOR(S) : Stephen P. Fenton et al.

Page 1 of 1

It is certified that error appears in the above-identified patent and that said Letters Patent is hereby corrected as shown below:

<u>Column 18,</u>
Line 44, delete "to" and insert -- to a -- after "tree".
Line 54, after "riser is" insert -- disconnected to position the well drilling derrick assembly above the second wellhead housing. --.

<u>Column 19,</u>
Lines 15 and 44, delete "step".

<u>Column 20,</u>
Lines 33 and 53, delete "land" and insert -- landing --.

Signed and Sealed this

Fourth Day of April, 2006

JON W. DUDAS
*Director of the United States Patent and Trademark Office*